US012593318B2

(12) United States Patent
Abotabl et al.

(10) Patent No.: US 12,593,318 B2
(45) Date of Patent: Mar. 31, 2026

(54) TIME DOMAIN PATTERN SWITCHING

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Abdelrahman Mohamed Ahmed Mohamed Ibrahim, San Diego, CA (US); Krishna Kiran Mukkavilli, San Diego, CA (US); Alexandros Manolakos, Escondido, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 317 days.

(21) Appl. No.: 18/262,540

(22) PCT Filed: Mar. 11, 2022

(86) PCT No.: PCT/US2022/071102
§ 371 (c)(1),
(2) Date: Jul. 21, 2023

(87) PCT Pub. No.: WO2022/198181
PCT Pub. Date: Sep. 22, 2022

(65) Prior Publication Data
US 2024/0080815 A1      Mar. 7, 2024

(30) Foreign Application Priority Data
Mar. 16, 2021      (GR) ............................... 20210100158

(51) Int. Cl.
*H04W 72/0446* (2023.01)
*H04W 72/232* (2023.01)

(52) U.S. Cl.
CPC ..... *H04W 72/0446* (2013.01); *H04W 72/232* (2023.01)

(58) Field of Classification Search
None
See application file for complete search history.

(56) References Cited

U.S. PATENT DOCUMENTS

| | | | |
|---|---|---|---|
| 11,695,536 B1 * | 7/2023 | Mansour | ................. H04L 5/006 370/280 |
| 12,155,601 B2 * | 11/2024 | Baldemair | ............ H04L 5/0073 |
| 2012/0207038 A1 * | 8/2012 | Choi | ..................... H04W 16/14 455/67.11 |

(Continued)

OTHER PUBLICATIONS

International Search Report and Written Opinion—PCT/US2022/071102—ISA/EPO—Jul. 25, 2022.

(Continued)

*Primary Examiner* — Otis L Thompson, Jr.
(74) *Attorney, Agent, or Firm* — Harrity & Harrity, LLP

(57) ABSTRACT

Various aspects of the present disclosure generally relate to wireless communication. In some aspects, a user equipment (UE) may receive, from a base station, an indication to switch from a first time domain pattern to a second time domain pattern. The UE may switch to the second time domain pattern a switching time duration after receiving the indication. The UE may communicate with the base station according to the second time domain pattern. Numerous other aspects are described.

24 Claims, 19 Drawing Sheets

(56) References Cited

U.S. PATENT DOCUMENTS

| | | | | |
|---|---|---|---|---|
| 2013/0044651 | A1* | 2/2013 | Wang | H04W 72/20 370/280 |
| 2013/0301492 | A1* | 11/2013 | Ji | H04L 5/0096 370/280 |
| 2014/0010128 | A1* | 1/2014 | He | H04W 76/11 370/280 |
| 2014/0146696 | A1* | 5/2014 | Lin | H04L 5/0094 370/252 |
| 2014/0334353 | A1* | 11/2014 | Wei | H04W 72/1263 370/280 |
| 2014/0369221 | A1* | 12/2014 | Fu | H04L 5/0044 370/252 |
| 2015/0092631 | A1* | 4/2015 | Meng | H04L 1/1887 370/280 |
| 2015/0195056 | A1* | 7/2015 | He | H04W 72/20 370/280 |
| 2015/0208382 | A1* | 7/2015 | Yao | H04W 72/0446 370/280 |
| 2015/0289261 | A1* | 10/2015 | Oizumi | H04L 1/1825 370/329 |
| 2015/0372798 | A1* | 12/2015 | Zhao | H04W 28/18 370/280 |
| 2016/0112946 | A1* | 4/2016 | Yi | H04W 48/20 370/280 |
| 2017/0171787 | A1* | 6/2017 | Fu | H04W 74/0833 |
| 2017/0373818 | A1* | 12/2017 | Lu | H04L 5/14 |
| 2018/0152957 | A1* | 5/2018 | Zhang | H04W 72/54 |
| 2019/0045397 | A1* | 2/2019 | Mueck | H04W 72/53 |
| 2019/0141695 | A1 | 5/2019 | Babaei et al. | |
| 2020/0313837 | A1* | 10/2020 | Vejlgaard | H04W 72/541 |

OTHER PUBLICATIONS

Moderator (China Telecom): "[103-e-NR-CovEnh-04] Summary of Email Discussion on PUSCH", 3GPP TSG RAN WG1 Meeting #103-e, R1-2009814, 3rd Generation Partnership Project, Mobile Competence Centre, 650, Route Des Lucioles, F-06921 Sophia-Antipolis Cedex, France, vol. RAN WG1, No. E-Meeting, Oct. 26, 2020-Nov. 13, 2020 Nov. 19, 2020, XP051955965, 204 Pages.
Partial International Search Report—PCT/US2022/071102—ISA/EPO—Jun. 3, 2022.

* cited by examiner

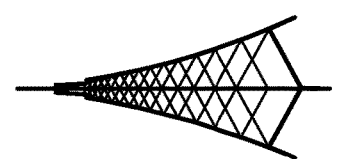
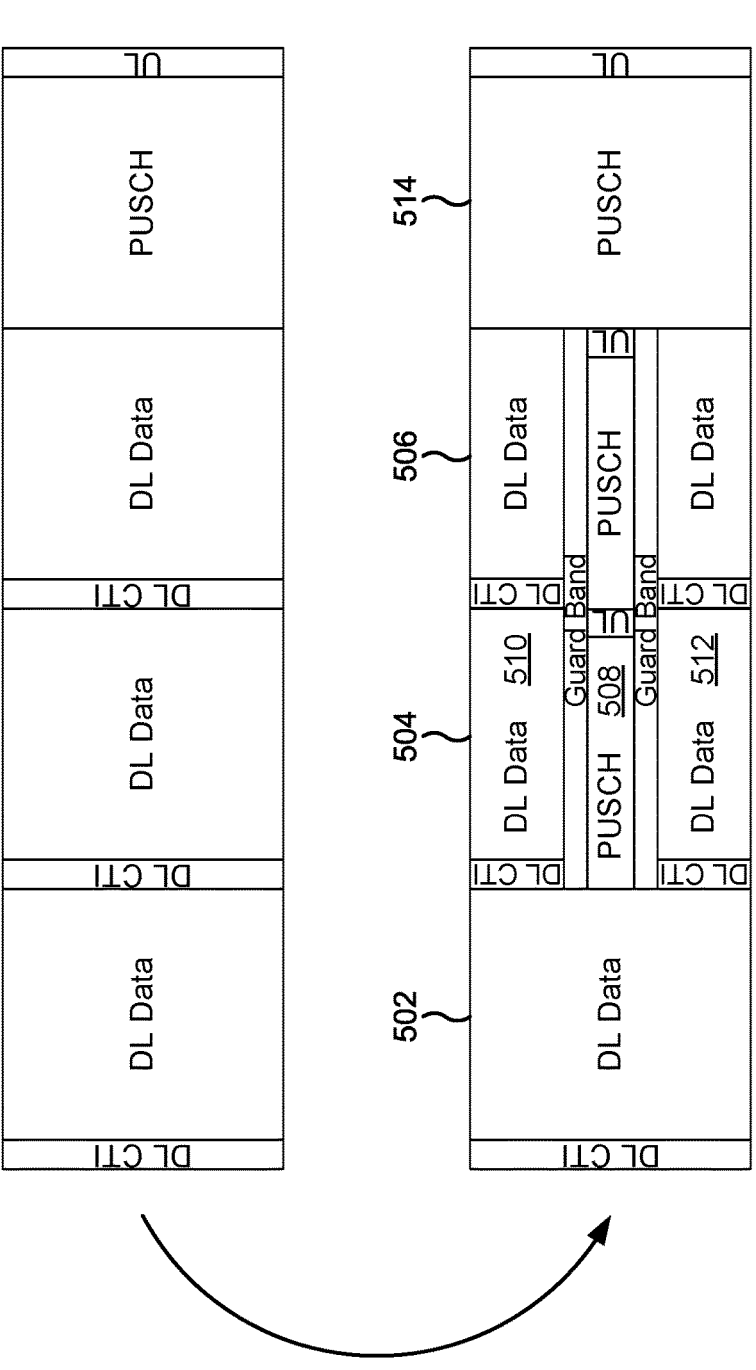
FIG. 5

FIG. 7

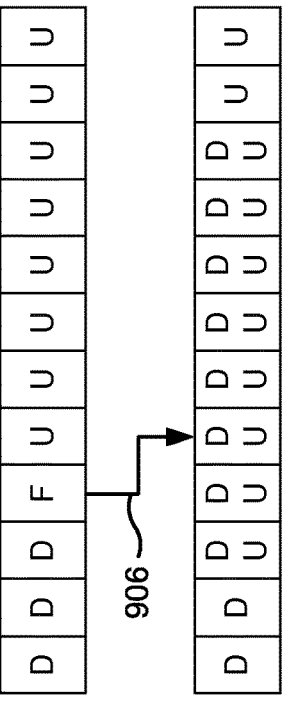
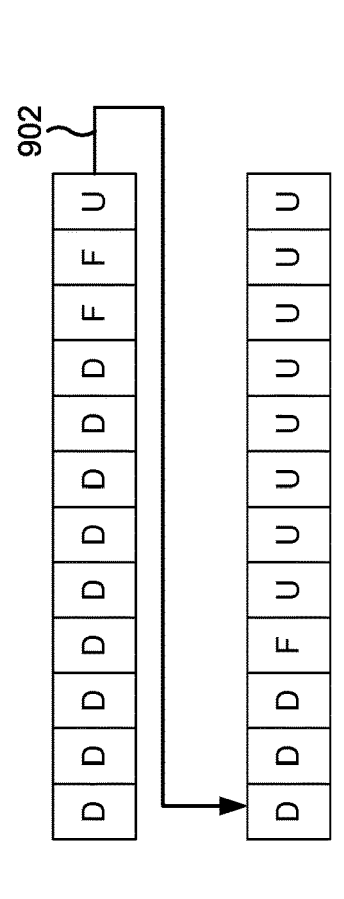
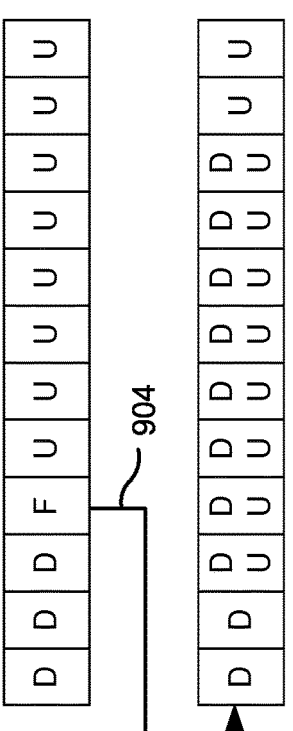
FIG. 9

1100

1125
Receive last uplink grant for current subframe

1130
Transmit last communication for current subframe

1135
Switch to new time domain pattern

1140
Communicate according to new time domain pattern

UE
1120

Base Station
1110

1210  Receive, from a base station, an indication to switch from a first time domain pattern to a second time domain pattern 1220  Switch to the second time domain pattern a switching time duration after receiving the indication 1230  Communicate with the base station according to the second time domain pattern

1200

1310 — Transmit, to a user equipment (UE), an indication to switch from a first time domain pattern to a second time domain pattern a switching time duration after receiving the indication 1320 — Communicate with the UE according to the second time domain pattern

1300

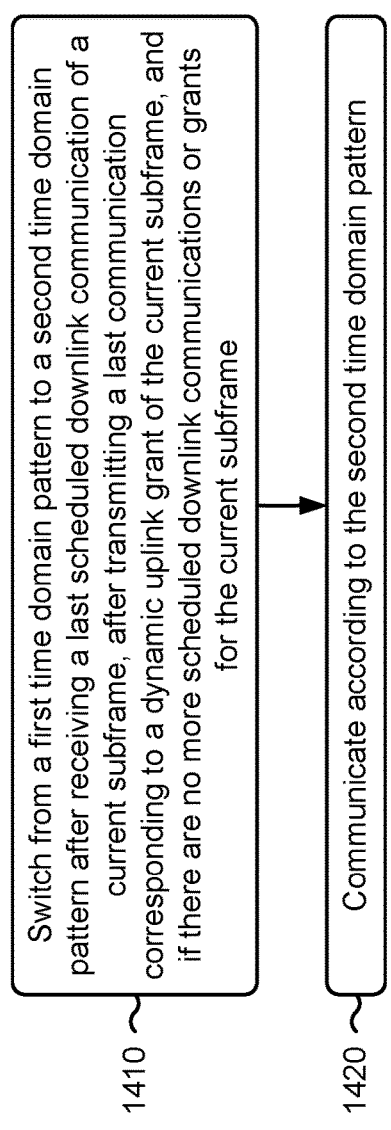

Switch from a first time domain pattern to a second time domain pattern after receiving a last scheduled downlink communication of a current subframe, after transmitting a last communication corresponding to a dynamic uplink grant of the current subframe, and if there are no more scheduled downlink communications or grants for the current subframe

1410

Communicate according to the second time domain pattern

Switch from a first time domain pattern to a second time domain pattern after receiving an indication of the second time domain pattern

1520

Communicate according to the second time domain pattern

1500

TIME DOMAIN PATTERN SWITCHING

CROSS-REFERENCE TO RELATED APPLICATIONS

This Patent Application is a 371 national stage of PCT Application No. PCT/US2022/071102 filed on Mar. 11, 2022, entitled "TIME DOMAIN PATTERN SWITCHING," which claims priority to Greece Patent Application Serial No. 20210100158, filed on Mar. 16, 2021, entitled "TIME DOMAIN PATTERN SWITCHING," and assigned to the assignee hereof. The disclosure of the prior Applications are considered part of and is are incorporated by reference into this Patent Application.

FIELD OF THE DISCLOSURE

Aspects of the present disclosure generally relate to wireless communication and to techniques and apparatuses for time domain pattern switching.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" or "forward link" refers to the communication link from the BS to the UE, and "uplink" or "reverse link" refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving, from a base station, an indication to switch from a first time domain pattern to a second time domain pattern, switching to the second time domain pattern a switching time duration after receiving the indication, and communicating with the base station according to the second time domain pattern.

In some aspects, a method of wireless communication performed by a base station includes transmitting, to a UE, an indication to switch from a first time domain pattern to a second time domain pattern a switching time duration after receiving the indication, and communicating with the UE according to the second time domain pattern.

In some aspects, a method of wireless communication performed by a UE includes switching from a first time domain pattern to a second time domain pattern after receiving a last scheduled downlink communication of a current subframe, after transmitting a last communication corresponding to a dynamic uplink grant of the current subframe, and if there are no more scheduled downlink communications or grants for the current subframe. The method may include communicating according to the second time domain pattern.

In some aspects, a method of wireless communication performed by a UE includes switching from a first time domain pattern to a second time domain pattern after receiving an indication of the second time domain pattern, and communicating according to the second time domain pattern.

In some aspects, a UE for wireless communication includes a memory and one or more processors, coupled to the memory, configured to receive, from a base station, an indication to switch from a first time domain pattern to a second time domain pattern, switch to the second time domain pattern a switching time duration after receiving the indication, and communicate with the base station according to the second time domain pattern.

In some aspects, a base station for wireless communication includes a memory and one or more processors, coupled to the memory, configured to transmit, to a UE, an indication to switch from a first time domain pattern to a second time domain pattern a switching time duration after receiving the indication, and communicate with the UE according to the second time domain pattern.

In some aspects, a UE for wireless communication includes a memory and one or more processors, coupled to the memory, configured to switch from a first time domain pattern to a second time domain pattern after receiving a last scheduled downlink communication of a current subframe, after transmitting a last communication corresponding to a dynamic uplink grant of the current subframe, and if there are no more scheduled downlink communications or grants for the current subframe. The memory and the one or more processors may be configured to communicate according to the second time domain pattern.

In some aspects, a UE for wireless communication includes a memory and one or more processors, coupled to the memory, configured to switch from a first time domain pattern to a second time domain pattern after receiving an indication of the second time domain pattern, and communicate according to the second time domain pattern.

In some aspects, a non-transitory computer-readable medium storing a set of instructions for wireless communication includes one or more instructions that, when executed by one or more processors of a UE, cause the UE to receive, from a base station, an indication to switch from a first time domain pattern to a second time domain pattern; switch to the second time domain pattern a switching time duration after receiving the indication, and communicate with the base station according to the second time domain pattern.

In some aspects, a non-transitory computer-readable medium storing a set of instructions for wireless communication includes one or more instructions that, when executed by one or more processors of a base station, cause the base station to transmit, to a UE, an indication to switch from a first time domain pattern to a second time domain pattern a switching time duration after receiving the indication, and communicate with the UE according to the second time domain pattern.

In some aspects, a non-transitory computer-readable medium storing a set of instructions for wireless communication includes one or more instructions that, when executed by one or more processors of a UE, cause the UE to switch from a first time domain pattern to a second time domain pattern after receiving a last scheduled downlink communication of a current subframe, after transmitting a last communication corresponding to a dynamic uplink grant of the current subframe, and if there are no more scheduled downlink communications or grants for the current subframe, and communicate according to the second time domain pattern.

In some aspects, a non-transitory computer-readable medium storing a set of instructions for wireless communication includes one or more instructions that, when executed by one or more processors of a UE, cause the UE to switch from a first time domain pattern to a second time domain pattern after receiving an indication of the second time domain pattern, and communicate according to the second time domain pattern.

In some aspects, an apparatus for wireless communication includes means for receiving, from a base station, an indication to switch from a first time domain pattern to a second time domain pattern, means for switching to the second time domain pattern a switching time duration after receiving the indication, and means for communicating with the base station according to the second time domain pattern.

In some aspects, an apparatus for wireless communication includes means for transmitting, to a UE, an indication to switch from a first time domain pattern to a second time domain pattern a switching time duration after receiving the indication, and means for communicating with the UE according to the second time domain pattern.

In some aspects, an apparatus for wireless communication includes means for switching from a first time domain pattern to a second time domain pattern after receiving a last scheduled downlink communication of a current subframe, after transmitting a last communication corresponding to a dynamic uplink grant of the current subframe, and if there are no more scheduled downlink communications or grants for the current subframe, and means for communicating according to the second time domain pattern.

In some aspects, an apparatus for wireless communication includes means for switching from a first time domain pattern to a second time domain pattern after receiving an indication of the second time domain pattern, and means for communicating according to the second time domain pattern.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 5 is a diagram illustrating an example of opportunistic sub-band full duplex communication, in accordance with the present disclosure.

FIG. 7 is a diagram illustrating an example of selecting a time domain pattern from multiple time domain patterns, in accordance with the present disclosure.

FIG. 9 is a diagram illustrating an example of timing for switching time domain patterns, in accordance with the present disclosure.

FIG. 14 is a diagram illustrating an example process performed, for example, by a UE, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
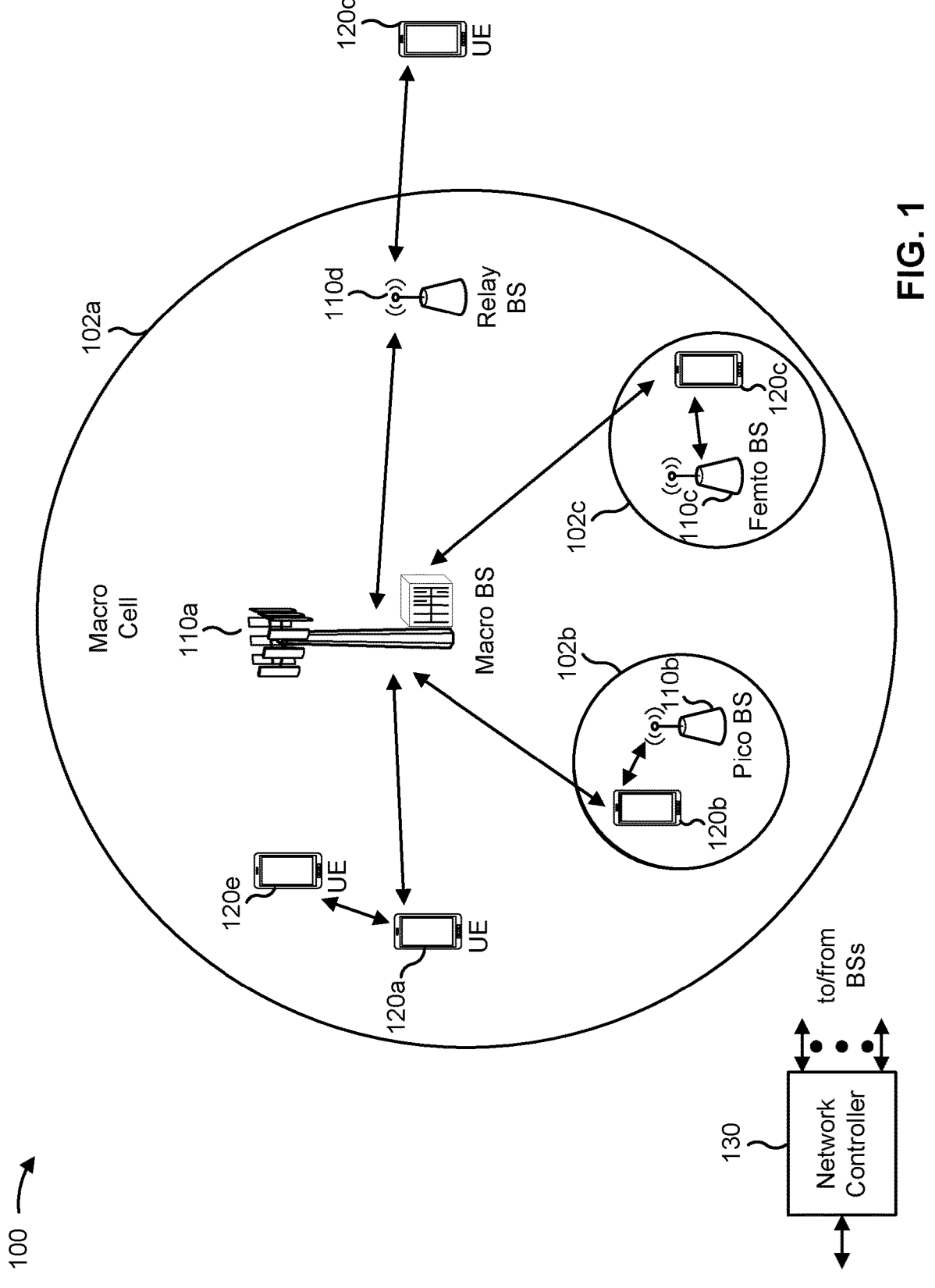
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

In some aspects, the term "base station" (e.g., the base station 110) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station" or "network entity" may refer to one device configured to perform one or more functions, such as those described herein in connection with the base station 110. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, and/or a relay.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
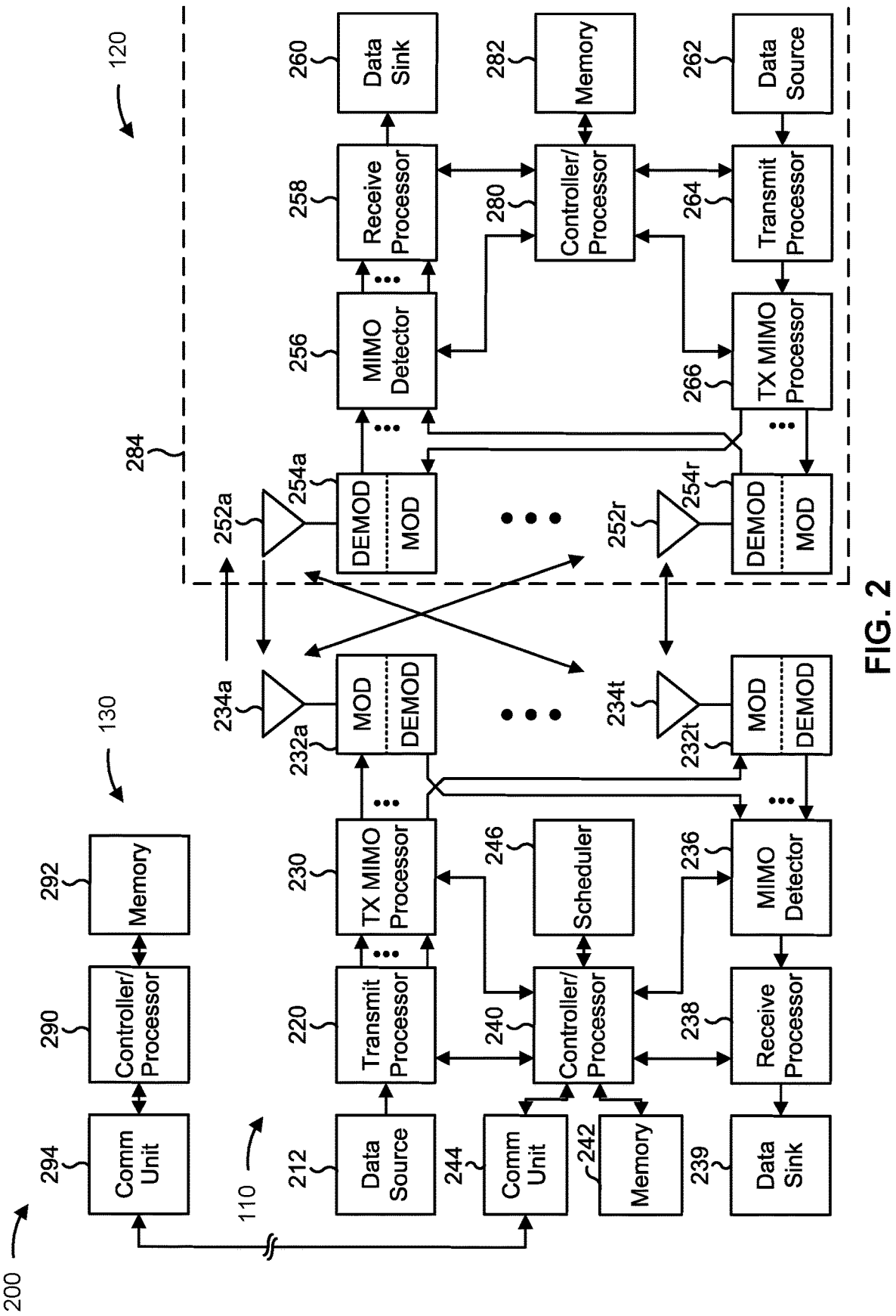
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/ or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 3-19).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 3-19).

Controller/processor 240 of base station 110, controller/ processor 280 of UE 120, and/or any other component(s) of FIG. 2 may perform one or more techniques associated with time domain pattern switching, as described in more detail elsewhere herein. For example, controller/processor 240 of base station 110, controller/processor 280 of UE 120, and/or any other component(s) of FIG. 2 may perform or direct operations of, for example, process 1200 of FIG. 12, process 1300 of FIG. 13, process 1400 of FIG. 14, process 1500 of FIG. 15, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1200 of FIG. 12, process 1300 of FIG. 13, process 1400 of FIG. 14, process 1500 of FIG. 15, and/or other processes as described herein. In some aspects, executing instructions may include running the instructions, converting the instructions, compiling the instructions, and/or interpreting the instructions, among other examples.

In some aspects, the UE 120 includes means for receiving, from a base station, an indication to switch from a first time domain pattern to a second time domain pattern, means for switching to the second time domain pattern a switching time duration after receiving the indication, and/or means for communicating with the base station according to the second time domain pattern. The means for the UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282. In some aspects, the UE 120 includes means for transmitting a UE capability for the switching time duration.

In some aspects, the base station 110 includes means for transmitting, to a UE, an indication to switch from a first time domain pattern to a second time domain pattern a switching time duration after receiving the indication, and/or means for communicating with the UE according to the second time domain pattern. The means for the base station to perform operations described herein may include, for example, one or more of transmit processor 220, TX MIMO processor 230, modulator 232, antenna 234, demodulator 232, MIMO detector 236, receive processor 238, controller/ processor 240, memory 242, or scheduler 246. In some aspects, the base station 110 includes means for determining the second time domain pattern based at least in part on a UE capability of the UE for the switching time duration.

In some aspects, the UE 120 includes means for switching from a first time domain pattern to a second time domain pattern after receiving a last scheduled downlink communication of a current subframe, after transmitting a last communication corresponding to a dynamic uplink grant of the current subframe, and if there are no more scheduled downlink communications or grants for the current subframe, and/or means for communicating according to the second time domain pattern.

In some aspects, the UE 120 includes means for switching from a first time domain pattern to a second time domain pattern after receiving an indication of the second time domain pattern, and/or means for communicating according to the second time domain pattern. In some aspects, the UE 120 includes means for selecting the second time domain pattern from among multiple time domain patterns based at least in part on an energy efficiency of the second time domain pattern.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

A UE and a base station may use time domain patterns for communications. A time domain pattern may include a time division duplex (TDD) pattern that specifies when, in the time domain, a UE is to transmit in an uplink direction, receive in a downlink direction, or not communicate. For example, the transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., 2m slots per subframe, where m is an index of a numerology used for a transmission, such as 0, 1, 2, 3, 4, or another number). Each slot may include a set of L symbol periods. For example, each slot may include fourteen symbol periods, seven symbol periods, or another number of symbol periods. In a case where the subframe includes two slots (e.g., when m=1), the subframe may include 2L symbol periods, where the 2L symbol periods in each subframe may be assigned indices of 0 through 2L−1. A time domain pattern may also include a slot format, which is a schedule specifying the communication direction, if any, for a slot in a subframe or symbol in a slot. For example, a slot format may specify that the first 10 consecutive symbols of a slot are for uplink (U), a following symbol is a guard symbol, and the remaining 3 symbols are for downlink (D). A symbol may also be a flex (F) symbol that may be for uplink or downlink, depending on dynamic scheduling or a dynamic grant. A unique slot format may be associated with a slot format indicator (SFI).

Figure 3:
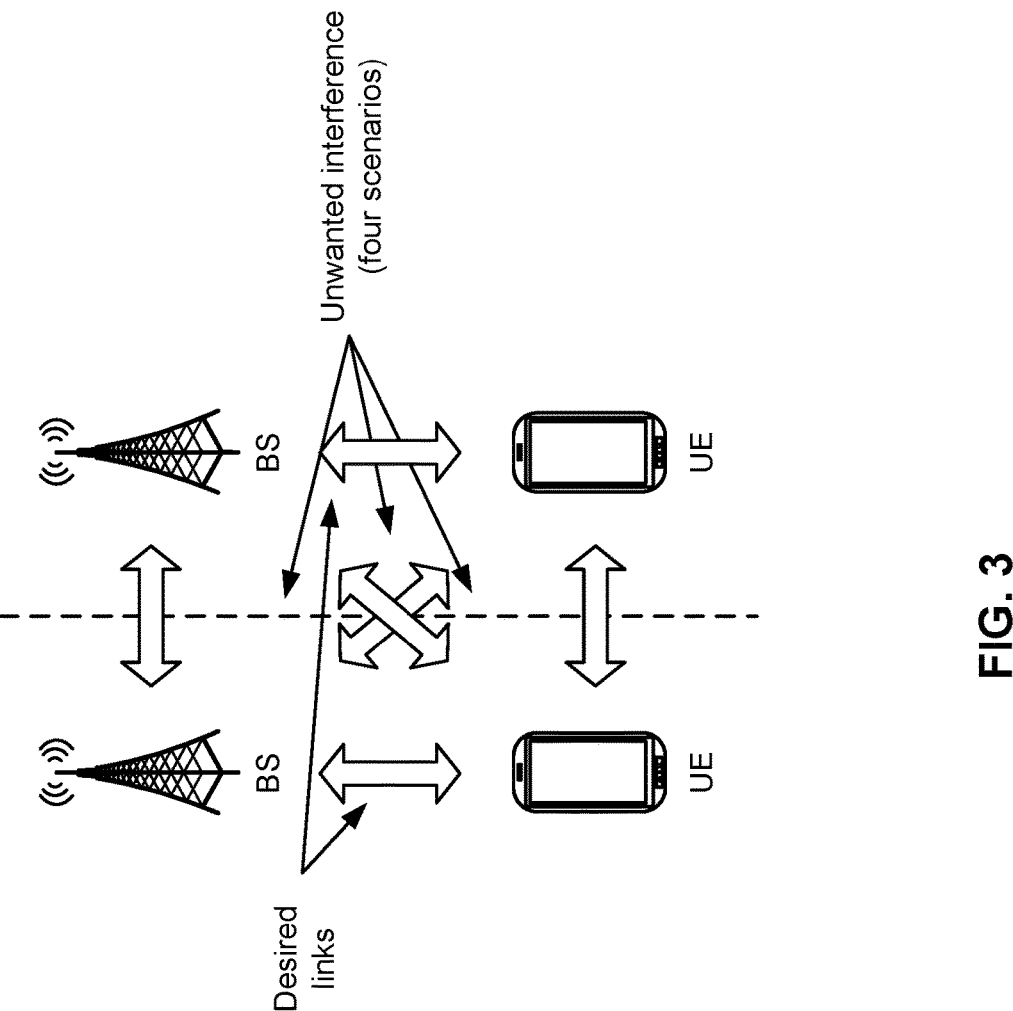
FIG. 3 is a diagram illustrating an example of neighboring networks at a border between countries, in accordance with the present disclosure.

FIG. 3 is a diagram illustrating an example 300 of neighboring networks at a border between countries, in accordance with the present disclosure.

Two TDD networks may be deployed near each other and may operate in a same frequency band, such as 3400-3800 MHz. Each network may share channels (co-channel scenario) or use adjacent channels. The two networks may be deployed near a border of neighboring countries, as shown by example 300. Each network may have a desired link between a base station (BS) and a UE or mobile station. Unfortunately, there may be unwanted interference, because there may be no synchronization or coordination between the networks (scheduling is asynchronous). There may be cross-link interference when there are simultaneous transmissions in the uplink and the downlink, such as if one network is transmitting on a channel in the uplink and the other network is transmitting on the channel or an adjacent channel in the downlink. There may also be interference between UEs of each network or between base stations of each network.

As indicated above, FIG. 3 is provided as an example. Other examples may differ from what is described with regard to FIG. 3.

Figure 4:
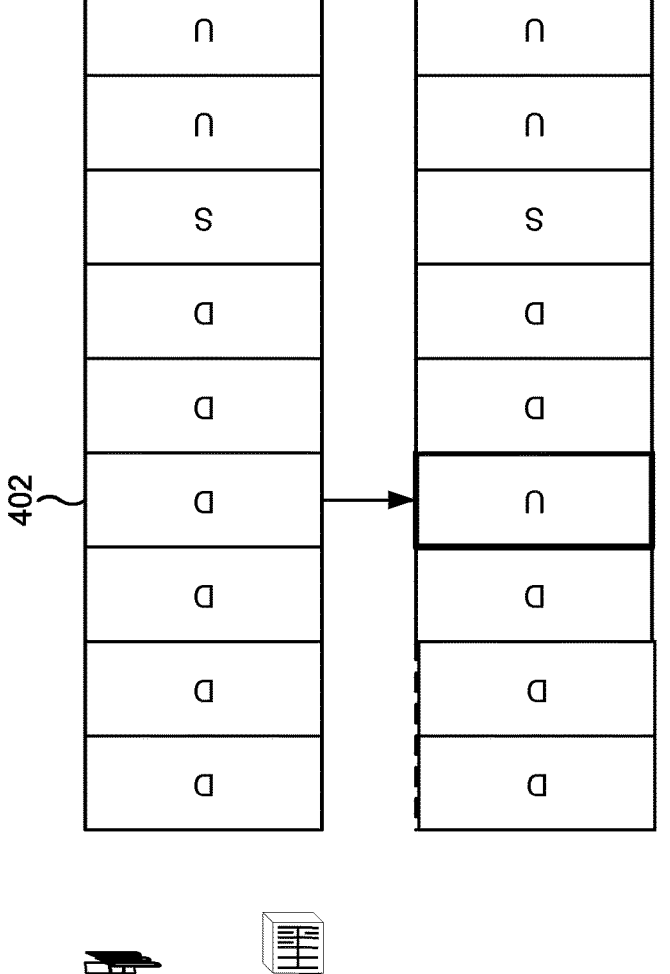
FIG. 4 is a diagram illustrating an example of opportunistic conversion for cross-border communications, in accordance with the present disclosure.

FIG. 4 is a diagram illustrating an example 400 of opportunistic conversion for cross-border communications, in accordance with the present disclosure.

During the slots of asynchronous schemes or during the flexible slots of semi-synchronous schemes, different base stations may utilize the same traffic directions or different traffic directions so that there could be no interference or collisions between the base stations. For one base station to receive uplink communications reliably (especially for ultra-reliable low-latency communications (URLLC) scenarios), the base station may use either a dedicated uplink slot (semi-synchronous scheme), which may suffer from long latency, or use uplink slots with "possible" interference from a base station of another network (e.g., across the border). One solution includes the base station opportunistically converting some of the downlink slots into uplink slots to reliably receive data or control information from UEs. Example 400 shows how a downlink slot 402 may be converted to an uplink slot instead of waiting until dedicated uplink slots become available later.

As indicated above, FIG. 4 is provided as an example. Other examples may differ from what is described with regard to FIG. 4.

FIG. 5 is a diagram illustrating an example 500 of opportunistic sub-band full duplex communication, in accordance with the present disclosure.

Full duplex involves transmission on the uplink and the downlink at the same time. A base station capable of full duplex may sense the channel and convert a legacy downlink slot into a full duplex slot with simultaneous uplink and downlink transmissions, whether in the same frequency band or in a sub-band (sub-band full duplex (SBFD)). The base station may transmit a group common SFI to a UE to indicate the new slot format. The base station may also indicate the change in the slot format to other base stations via a link between the base stations.

Example 500 shows multiple slots, including 3 slots for downlink and 1 slot for uplink on a physical uplink shared channel (PUSCH). There may be intervening symbols as guard symbols for downlink crossed timeslot interference (DL CTI). The first slot 502 may be for downlink, but the base station may convert the second slot 504 and the third slot 506 to SBFD, such that the UE is able to transmit on the PUSCH in an uplink sub-band 508 while data is received on the downlink in other sub-bands 510 and 512. The UE may then transmit in the uplink with uplink slot 514. In this way, the UE does not need to wait until slot 514 to transmit on the uplink.

As indicated above, FIG. 5 is provided as an example. Other examples may differ from what is described with regard to FIG. 5.

Figure 6:
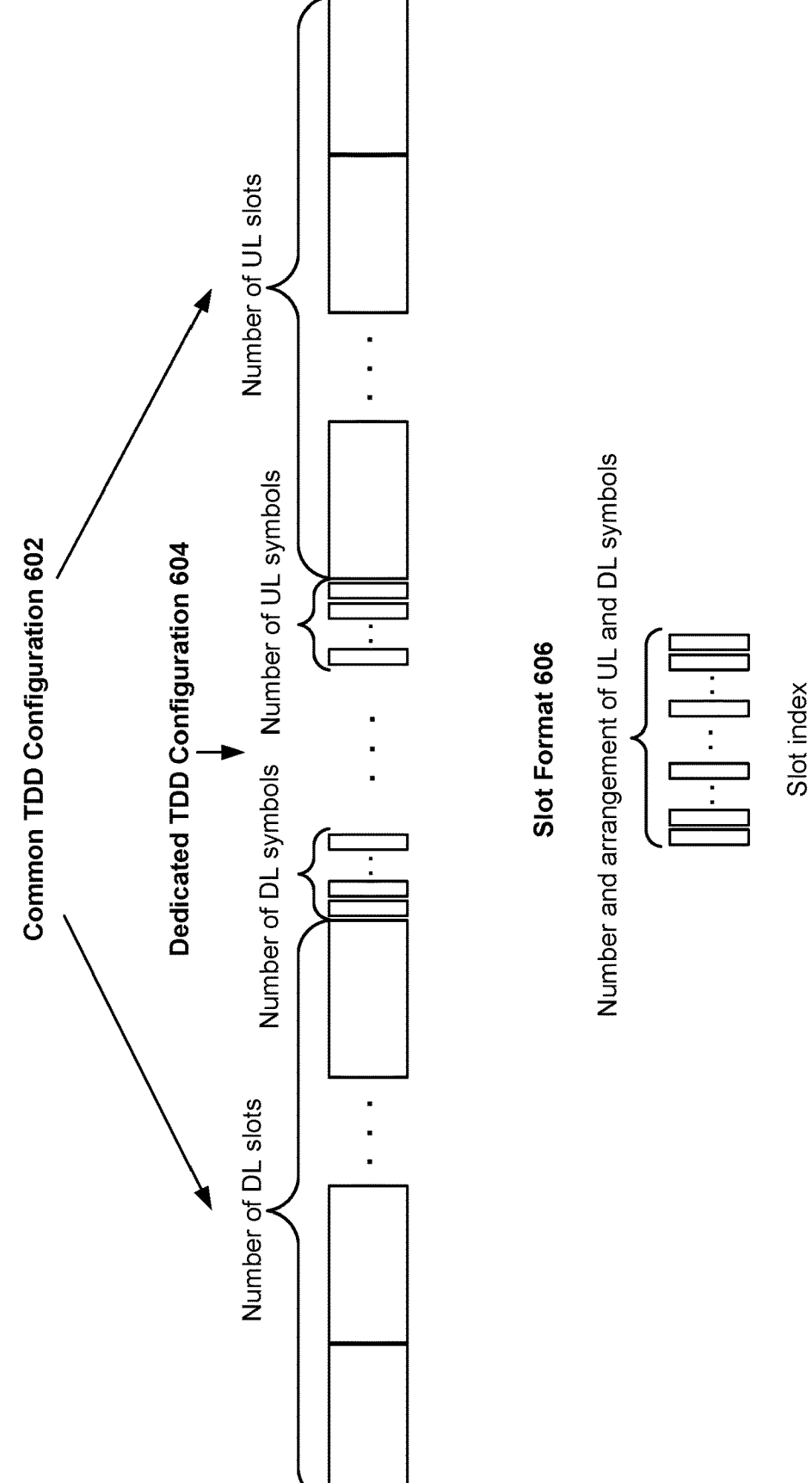
FIG. 6 is a diagram illustrating an example of a slot format, in accordance with the present disclosure.

FIG. 6 is a diagram illustrating an example 600 of a slot format, in accordance with the present disclosure.

A time domain pattern may include a common TDD configuration (TDD-IL-DL-ConfigurationCommon), a dedicated TDD configuration (TDD-UL-DL-ConfigDedicated), and/or a slot format (SlotFormatCombination). Example 600 shows a common TDD configuration 602, which may be a fixed pattern and/or fixed quantities of uplink and downlink slots. Example 600 shows a dedicated TDD configuration

604 that may be used to configure all or part of existing flexible slots and/or symbols. Example 600 also shows a slot format 606, which may be a combination of slots specified by an SFI in downlink control information (DCI) format 2_0. However, the UE is configured with a single time domain pattern. There are not multiple time domain patterns for selection by the UE. More flexibility is necessary for various scenarios, such as communications near a border between countries, where one network may use synchronous scheduling and the neighboring network may use asynchronous scheduling with different TDD patterns, or where there is scheduling between sub-band half duplex (SBHD) and SBFD with different TDD patterns. Without sufficient flexibility, interference and/or collisions in the same or adjacent frequency resources may degrade communications. Degraded communications cause the UE and the base station to consume additional processing resources and signaling resources to handle failed communications and/or retransmissions.

As indicated above, FIG. 6 is provided as an example. Other examples may differ from what is described with regard to FIG. 6.

Figure 7:
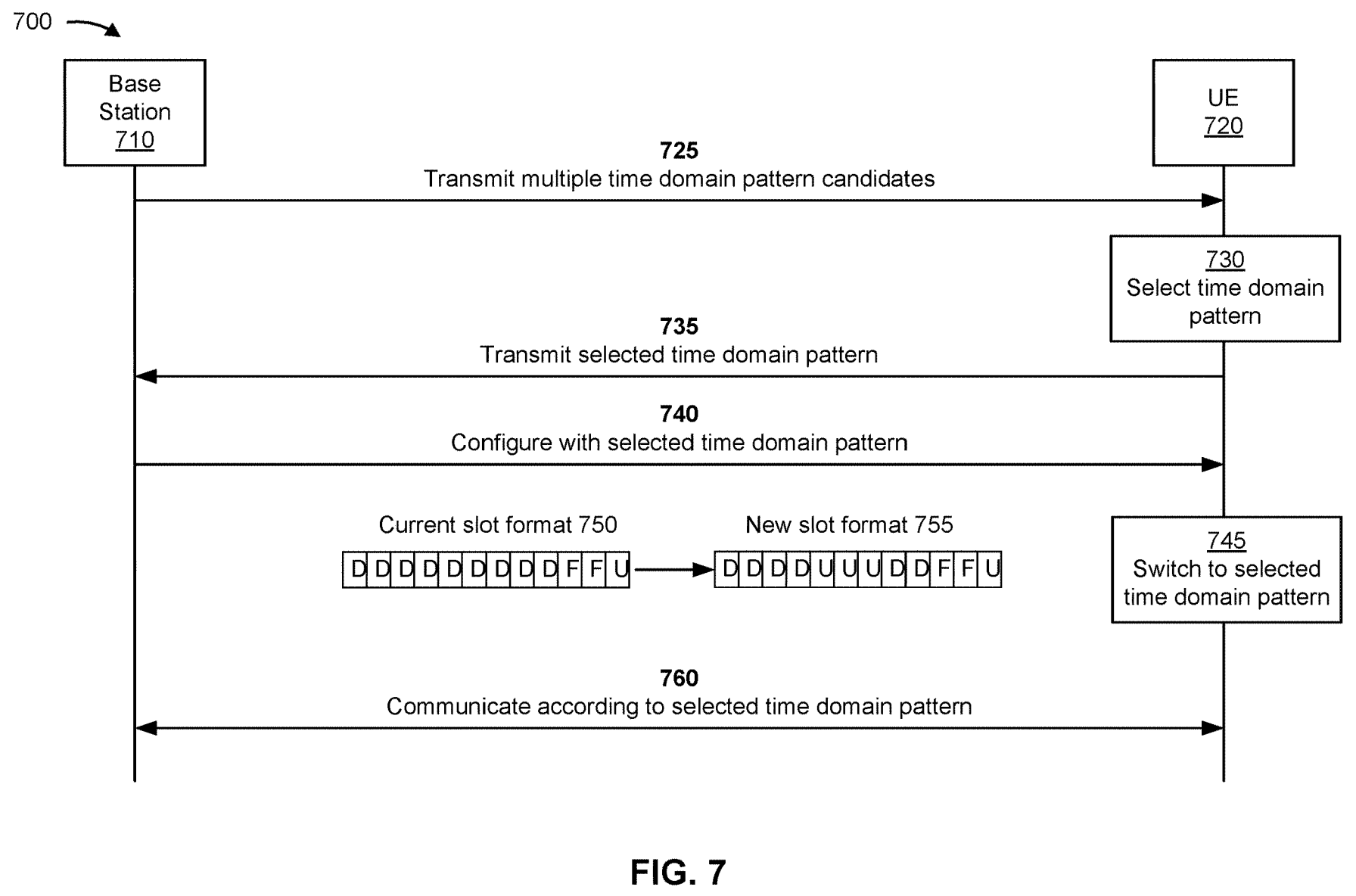

FIG. 7 is a diagram illustrating an example 700 of selecting a time domain pattern from multiple time domain patterns, in accordance with the present disclosure. Example 700 shows base station 710 and UE 720 that communicate according to a time domain pattern.

In some aspects, a base station may provide multiple time domain pattern candidates. The multiple time domain pattern candidates may include a list of multiple common TDD configurations, a list of multiple dedicated TDD configurations, and/or a list of multiple SFIs for multiple slot formats. While the UE may be configured with only one common TDD configuration, one dedicated TDD configuration, and one slot format at a time, the UE may select the common TDD configuration, the dedicated TDD configuration, and/or the slot format from the respective lists to construct a selected time domain pattern. In some aspects, a time domain pattern candidate may be a cross division duplex (XDD) configuration, which may include a TDD configuration, a frequency division duplex (FDD) configuration that changes over time, a full duplex configuration, a half duplex configuration, an SBHD configuration, an SBFD configuration, or any combination thereof. The UE may select the time domain pattern based at least in part on interference measurements, feedback messages, detected transmissions, channel sensing, and/or other information about communications from a neighboring network. The UE may switch to the selected time domain pattern, which may involve transmitting the selected time domain pattern to the base station and receiving a configuration for the selected time domain pattern. The UE and the base station may use a time domain pattern with less interference at the UE and thus communications may improve. Improved communications conserve power, processing resources, and signaling resources that would otherwise be consumed handling degraded communications.

Example 700 shows selection and use of a time domain pattern from among multiple time domain pattern candidates. As shown by reference number 725, the base station 710 may transmit multiple time domain pattern candidates to the UE 720. The base station 710 may generate the multiple time domain pattern candidates based at least in part on available time domain patterns for the network, a UE capability, coordination with other base stations or networks, information from other UEs, the frequency band, channel sensing, a history of neighboring time domain patterns and traffic conditions, and/or current traffic conditions. While time domain patterns may be described in terms of symbols or slots, various other time domain pattern formats may be used based at least in part on the numerology. The multiple time domain pattern candidates may apply to half duplex, full duplex, and/or sub-bands.

As shown by reference number 730, the UE 720 may select a time domain pattern from among the multiple time domain pattern candidates, including a common TDD configuration, a dedicated TDD configuration, and/or a slot format. The time domain pattern candidates may include one or more XDD configurations. As shown by reference number 735, the UE may transmit the selected time domain pattern, and the base station 710 may accept, modify, or reject the selected time domain pattern. If accepted, as shown by reference number 740, the base station 710 may configure or schedule the UE 720 with the selected time domain pattern. The base station 710 may transmit a switching indication in a sequence or in DCI. The indication may be one bit for a binary switching indication. That is, if the UE receives the simple indication, the UE may switch to a designated alternative time domain pattern. The UE may receive an indication to switch to a next time domain pattern in a specified order of time domain patterns. The indication may include two or more bits (e.g., first time domain pattern is 00, second time domain pattern is 01, and so forth) for a time domain pattern among a set of time domain patterns. The indication may include multiple bits or a bit map to specify the time domain pattern to use. In some aspects, the UE 720 may not wait for configuration by the base station 710 to use the selected time domain pattern.

As shown by reference number 745, the UE 720 may switch to (or start with) the selected time domain pattern. For example, the UE 720 may be using a current slot format 750 and may have selected a new slot format 755 from a list of multiple slot formats, indicated by SFIs. As shown by reference number 760, the base station 710 and the UE 720 may communicate according to the selected time domain pattern. By having multiple time domain pattern candidates to choose from, the UE 720 may have sufficient flexibility to handle interference scenarios, including interference from a neighboring network, across a country border, that does not coordinate its time domain pattern and transmissions with the network of the UE 720.

As indicated above, FIG. 7 is provided as an example. Other examples may differ from what is described with regard to FIG. 7.

Figure 8:
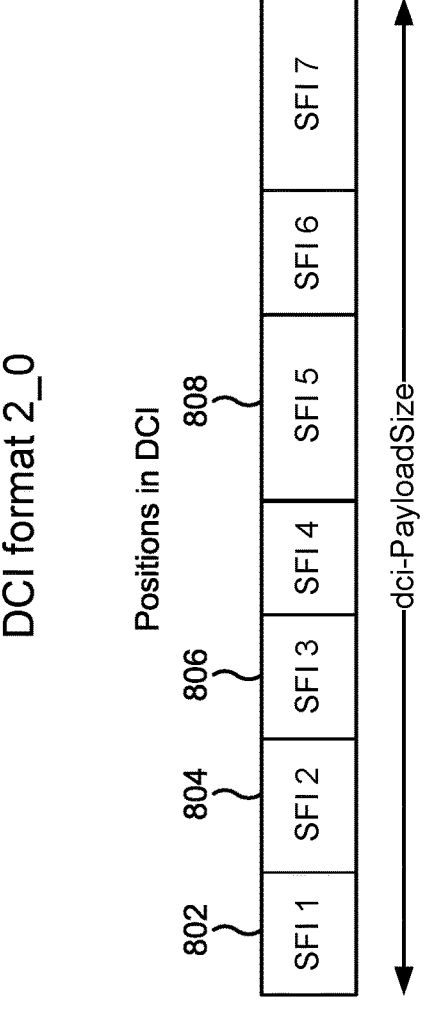
FIG. 8 is a diagram illustrating an example of downlink control information with slot format indicators, in accordance with the present disclosure.

FIG. 8 is a diagram illustrating an example 800 of DCI with SFIs, in accordance with the present disclosure.

Example 800 shows a DCI format 2_0 for indicating a slot format. The DCI may be of a specified payload size and include SFIs in different positions of the DCI. A UE may receive the DCI with a bit that indicates the DCI position for a specific SFI. The UE is to use the slot format indicated by the SFI. For example, if the UE receives a bit indicating DCI position 802, then the slot format of SFI 2 is used. Different SFIs may indicate different slot formats. For example, SFI 0 may be all downlink symbols for a slot and SFI 1 may be all uplink symbols.

In some aspects, a base station may indicate a list of multiple SFIs by configuring not just one DCI position, but multiple DCI positions. For example, the base station may use an additional bit or a different combination of bits to list SFIs 1-8 and SFI 5 in respective DCI positions 802, 804, 806, and 808. The UE may select one of these SFIs and switch to a corresponding slot format. The base station may indicate an active SFI. For example, the first DCI position listed may indicate the active SFI, or an SFI index may define the active SFI. Alternatively, or additionally, the base station may indicate the active SFI in the DCI format 2_0 and transmit the list of SFIs in a medium access control control element (MAC-CE) or a radio resource control (RRC) message. The MAC-CE or RRC message may also indicate multiple TDD patterns as part of the multiple time domain candidates. The base station may indicate SFI switching similar to bandwidth part switching.

In some aspects, the base station may transmit a new DCI format for time domain pattern switching. An existing radio network temporary identifier (RNTI) or a new RNTI, such as an SFI-RNTI, may be used for the DCI. The DCI may be UE-specific or a group common (GC) DCI. The DCI may indicate multiple time domain pattern candidates. In some aspects, the DCI may be scheduling DCI.

In some aspects, the UE may use opportunistic slot switching to a candidate time domain pattern. For example, the UE may switch to a different slot format within a next few symbols of a current slot. The UE may switch based at least in part on whether a time domain pattern matches a time domain pattern of an opportunistic conversion.

As indicated above, FIG. 8 is provided as an example. Other examples may differ from what is described with regard to FIG. 8.

FIG. 9 is a diagram illustrating an example 900 of timing for switching time domain patterns, in accordance with the present disclosure.

The UE may switch to a time domain pattern at different times. As shown by timing 902, the UE may switch to the new time domain pattern after an active time domain pattern for a slot is finished. As shown by timing 904, the UE may switch to the new time domain pattern in the middle of a current time domain pattern for a slot. The new pattern may start from the beginning of the time domain pattern in the next slot. As shown by timing 906, the UE may switch in the middle of a current time domain pattern, but start at the next symbol or a later symbol in the slot. The symbol may be indicated by a symbol index. For example, the UE may receive an indication to switch to the new time domain pattern at symbol 5 (received index for symbol 5). In this way, the UE is not delaying its uplink transmission, which may be especially beneficial in reducing latency for URLLC transmissions. Note that the time for switching may vary (symbol, slot, mini-slot) based at least in part on the numerology or may be a switching time duration (e.g. symbols, slots, mini-slots, milliseconds).

As indicated above, FIG. 9 is provided as an example. Other examples may differ from what is described with regard to FIG. 9.

Figure 10:
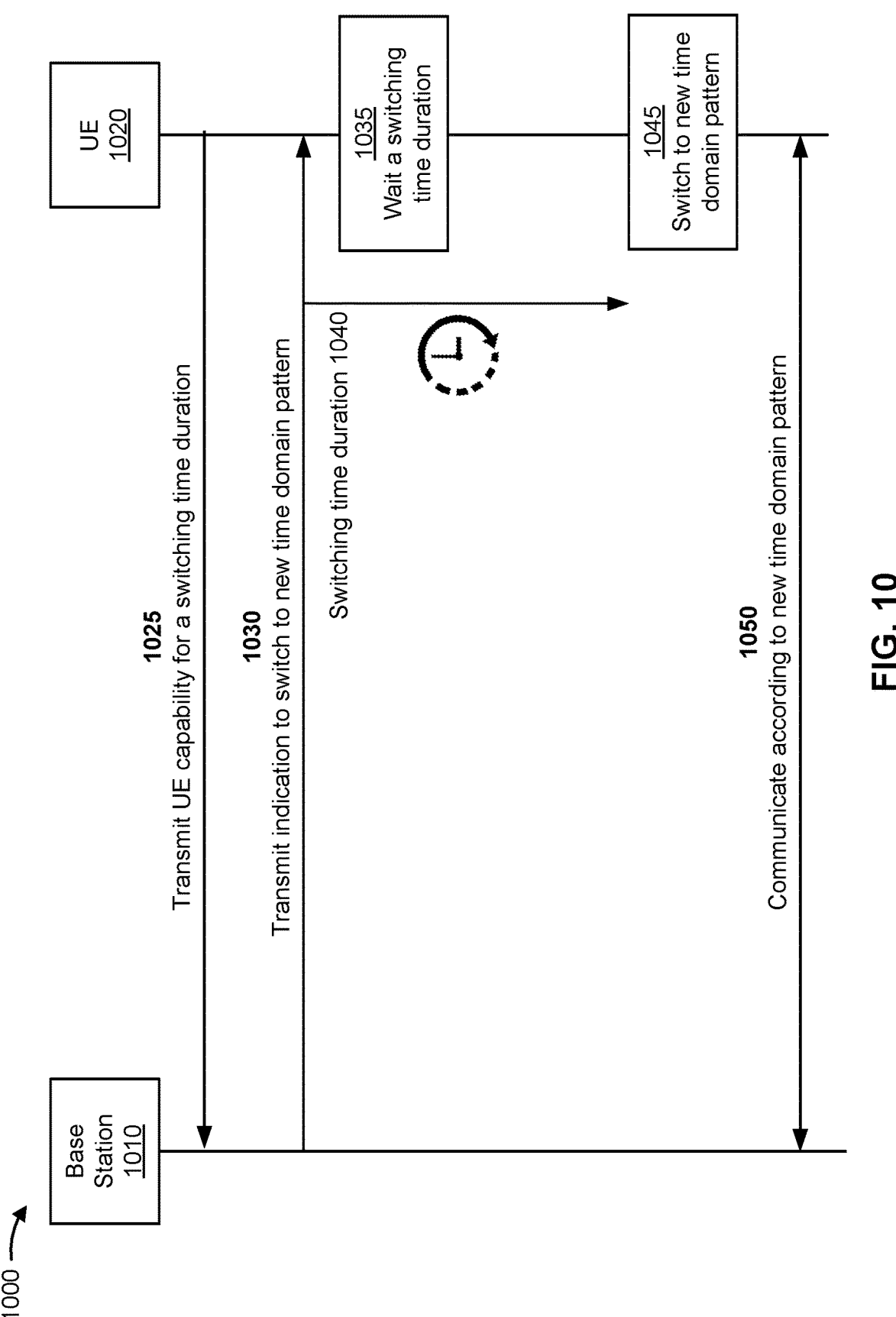
FIG. 10 is a diagram illustrating an example of time domain pattern switching, in accordance with the present disclosure.

FIG. 10 is a diagram illustrating an example 1000 of time domain pattern switching, in accordance with the present disclosure. Example 1000 shows base station 1010 (e.g., base station 110) and UE 1020 (e.g., UE 120) that communicate according to a time domain pattern.

A UE may select a new time domain pattern from among multiple time domain pattern candidates. However, if the UE takes too long to switch to the new time domain pattern, there may be unnecessary latency before the UE is able to transmit on the uplink. On the other hand, if the base station requests that the UE switch too soon, the UE may not be capable of switching in time, and this may cause the UE to miss scheduled transmissions with the new time domain pattern during the subframe. The UE may waste time, processing resources, and signaling resources with transmitting negative feedback and receiving new grants for missed transmission opportunities.

As described with respect to various aspects described herein, the UE may not switch immediately, but may wait for a switching time duration that starts upon receiving an indication to switch to the new time domain pattern and ends when the UE actually switches to the new time domain pattern. The UE may transmit a UE capability of a switching time duration to the base station, and the UE capability may be defined in terms of time (e.g., milliseconds), symbols, mini-slots, and/or slots, depending on a numerology of the network configuration. The switching time duration may vary based at least in part on a direction of the switching. For example, switching from a downlink symbol in a current time domain pattern to a downlink symbol in a new time domain pattern may involve a minimal amount of time, and switching from the downlink symbol in the current time domain pattern to an uplink symbol in the new time domain pattern may involve a greater amount of time. In this way, the UE may conserve time, processing resources, and signaling resources that would otherwise be consumed by handling missed transmission opportunities because the UE was not able to switch to and use the new time domain pattern in time. In some aspects, the switching time duration may not extend too long, in order to reduce latency to a shorter amount of time than if the UE waited until a later time or a later subframe. A reduction in latency may cause the UE to conserve time, power, and processing resources.

Example 1000 provides more details regarding when the UE 1020 is to switch to a new time domain pattern. As shown by reference number 1025, the UE 1020 may transmit a UE capability for a switching time duration. For example, the UE 1020 may indicate that the UE 1020 uses 2 symbols to complete a switch to a new time domain pattern.

As shown by reference number 1030, the base station 1010 may transmit an indication to switch to a new time domain pattern that was selected by the UE 1020 from among multiple time domain pattern candidates that the base station 1010 provided to the UE 1020. In some aspects, the indication may be a switching time duration, or the base station 1010 may indicate the switching time duration with the indication to switch. The indication to switch and/or the switching time duration may be transmitted in a MAC-CE or an RRC message. The switching time duration may be a time period (e.g., quantity of ms), a quantity of symbols, a quantity of mini-slots, a quantity of slots, and/or any other indication of an amount of time that is to pass between the UE 1020 receiving the indication to switch and the UE 1020 actually switching. The switching time duration may include a specified moment when the UE 1020 is to switch. The switching time duration may be based at least in part on the UE capability (e.g., 2 symbols).

As shown by reference number 1035, the UE 1020 may wait the switching time duration 1040 before switching to the new time domain pattern at reference number 1045. As shown by reference number 1050, the base station 1010 and the UE 1020 may communicate according to the new time domain pattern. By planning and/or dynamically controlling when the UE 1020 is to switch to a new time domain pattern, the base station 1010 and the UE 1020 avoid switching faster than a capability of the UE and avoid unnecessary latency.

As indicated above, FIG. 10 is provided as an example. Other examples may differ from what is described with regard to FIG. 10.

Figure 11:
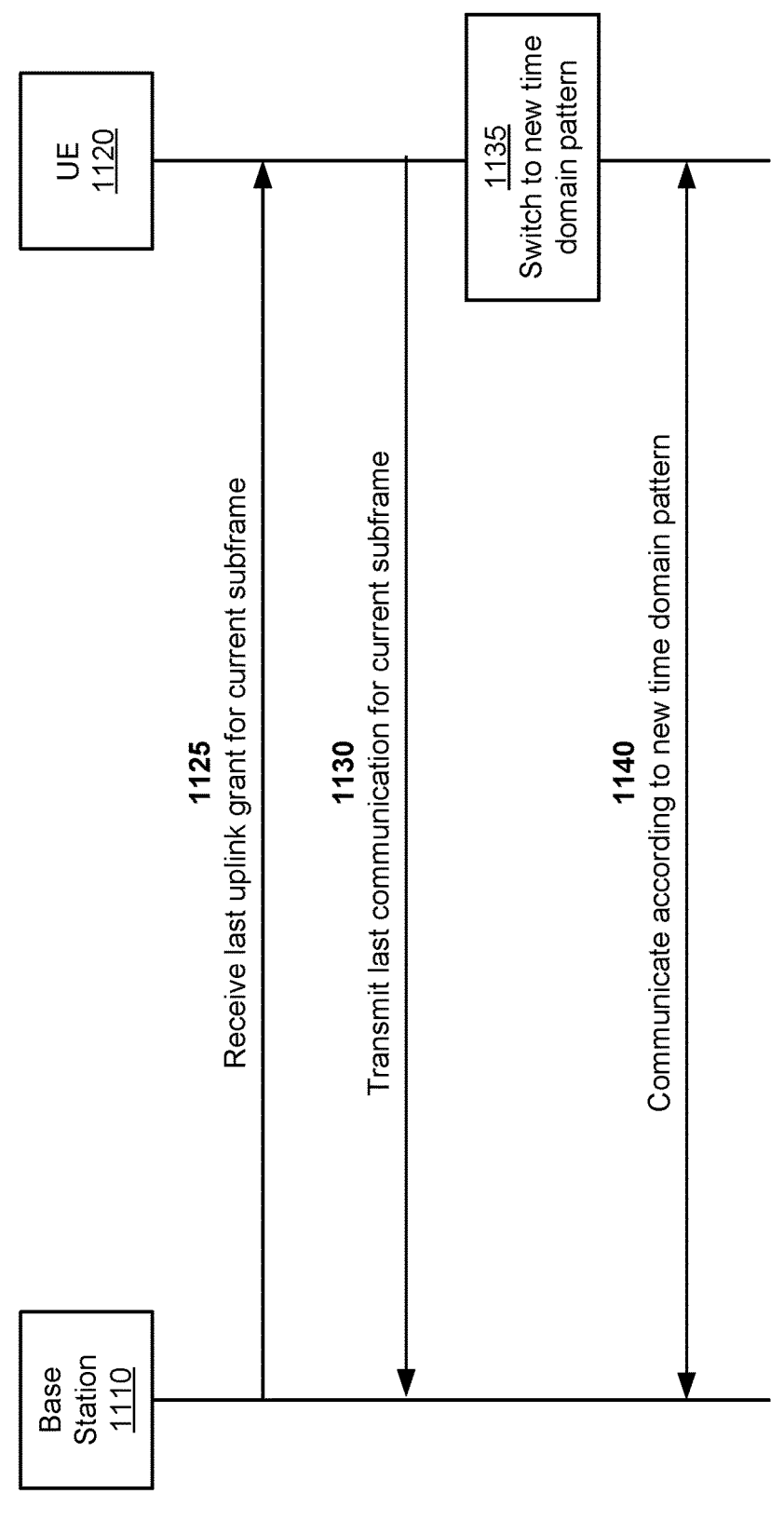
FIG. 11 is a diagram illustrating an example of time domain pattern switching, in accordance with the present disclosure.

FIG. 11 is a diagram illustrating an example 1100 of time domain pattern switching, in accordance with the present disclosure. Example 1100 shows base station 1110 (e.g., base station 110) and UE 1120 (e.g., UE 120) that communicate according to a time domain pattern and may switch to a new time domain pattern.

The UE 1120 may switch to a new time domain pattern after receiving an indication to switch, a switching time duration after receiving the indication, and/or after receiving an indication of the new time domain pattern. However, in some aspects, UE 1120 may switch after one or more conditions are met. For example, the UE 1120 may wait until after all the communications are completed for a current subframe and/or all the grants are received for the current subframe. This may help to avoid switching when it may not be an optimal time to switch.

Example 1100 shows an example of the UE 1120 waiting until some operations are completed (transmitted or received) before switching to a new time domain pattern. As shown by reference number 1125, the UE 1120 may receive a last uplink grant for a current subframe. That is, the UE 1120 is not expecting any more uplink grants for the current subframe. As shown by reference number 1130, the UE 1120 may also transmit a last communication (or receive a last communication) for the current subframe. After the grants are received and the communications are completed, the UE 1120 may determine that the UE 1120 is clear to switch to the new time domain pattern, as shown by reference number 1135. There may be other tasks that the UE 1120 is to complete before the conditions are fulfilled for switching. In some aspects, the condition may be related to saving time, energy, and/or complexity. For example, the UE 1120 may select a new time domain pattern from among multiple time domain patterns based at least in part on an energy efficiency of the new time domain pattern. The UE 1120 may compare predicted energy usage for each of the multiple time domain patterns to an energy threshold (e.g., minimum energy usage) or relative to each other. As shown by reference number 1140, the base station 1110 and the UE 1120 may communicate according to the new time domain pattern.

As indicated above, FIG. 11 is provided as an example. Other examples may differ from what is described with regard to FIG. 11.

Figure 12:
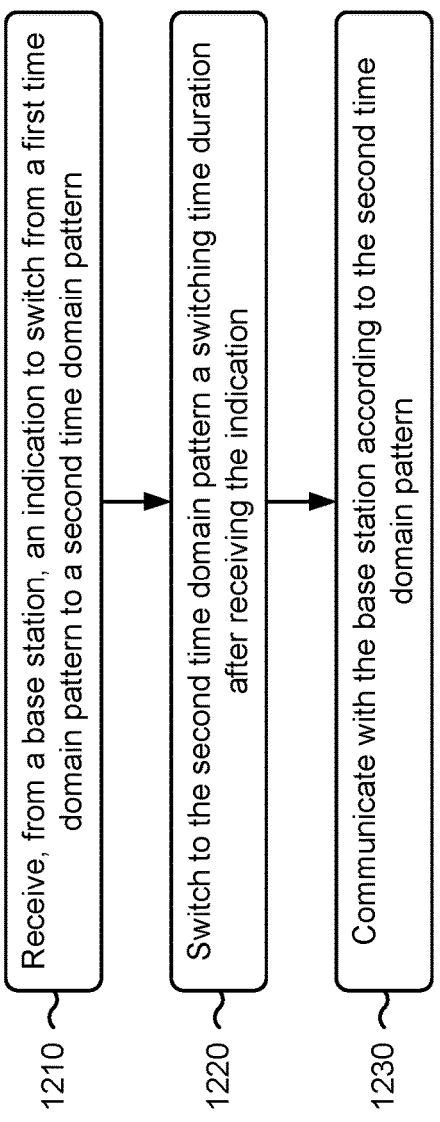
FIG. 12 is a diagram illustrating an example process performed, for example, by a UE, in accordance with the present disclosure.

FIG. 12 is a diagram illustrating an example process 1200 performed, for example, by a UE, in accordance with the present disclosure. Example process 1200 is an example where the UE (e.g., UE 120, UE 1020) performs operations associated with time domain pattern switching.

As shown in FIG. 12, in some aspects, process 1200 may include receiving, from a base station, an indication to switch from a first time domain pattern to a second time domain pattern (block 1210). For example, the UE (e.g., using reception component 1602 depicted in FIG. 16) may receive, from a base station, an indication to switch from a first time domain pattern to a second time domain pattern, as described above.

As further shown in FIG. 12, in some aspects, process 1200 may include switching to the second time domain pattern a switching time duration after receiving the indication (block 1220). For example, the UE (e.g., using switching component 1608 depicted in FIG. 16) may switch to the second time domain pattern a switching time duration after receiving the indication, as described above.

As further shown in FIG. 12, in some aspects, process 1200 may include communicating with the base station according to the second time domain pattern (block 1230). For example, the UE (e.g., using reception component 1602 and transmission component 1604 depicted in FIG. 16) may communicate with the base station according to the second time domain pattern, as described above.

Process 1200 may include additional aspects, such as any single aspect or any combination of aspects described below and/or in connection with one or more other processes described elsewhere herein.

In a first aspect, the indication indicates the switching time duration.

In a second aspect, alone or in combination with the first aspect, the indication is received in a MAC-CE or an RRC message.

In a third aspect, alone or in combination with one or more of the first and second aspects, the switching time duration includes one or more slots or symbols.

In a fourth aspect, alone or in combination with one or more of the first through third aspects, the switching time duration includes a quantity of milliseconds.

In a fifth aspect, alone or in combination with one or more of the first through fourth aspects, the indication is received in scheduling DCI.

In a sixth aspect, alone or in combination with one or more of the first through fifth aspects, process 1200 includes transmitting a UE capability for the switching time duration.

In a seventh aspect, alone or in combination with one or more of the first through sixth aspects, the second time domain pattern includes one or more of a common configuration of a TDD pattern that is different than a common configuration of a TDD pattern of the first time domain pattern, a dedicated configuration of a TDD pattern that is different than a dedicated configuration of a TDD pattern of the first time domain pattern, or a slot format that is different than a slot format of the first time domain pattern.

In an eighth aspect, alone or in combination with one or more of the first through seventh aspects, the multiple time domain pattern candidates include one or more XDD configurations.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
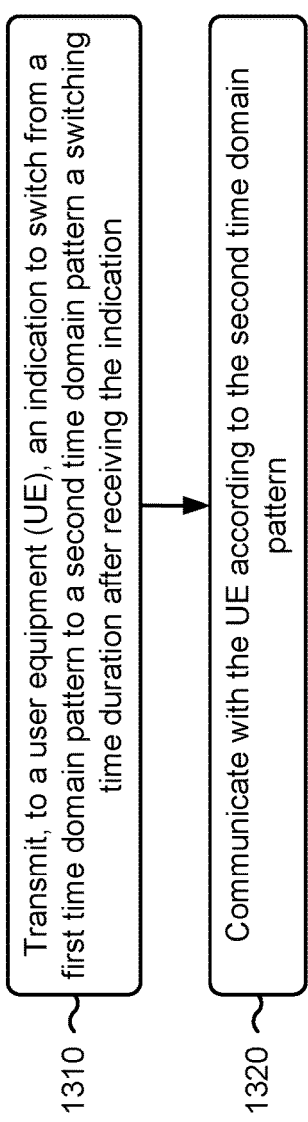
FIG. 13 is a diagram illustrating an example process performed, for example, by a base station, in accordance with the present disclosure.

FIG. 13 is a diagram illustrating an example process 1300 performed, for example, by a base station, in accordance with the present disclosure. Example process 1300 is an example where the base station (e.g., base station 110, base station 1010, base station 1110) performs operations associated with time domain pattern switching.

As shown in FIG. 13, in some aspects, process 1300 may include transmitting, to a UE, an indication to switch from a first time domain pattern to a second time domain pattern a switching time duration after receiving the indication (block 1310). For example, the base station (e.g., using transmission component 1704 depicted in FIG. 17) may transmit, to a UE, an indication to switch from a first time domain pattern to a second time domain pattern a switching time duration after receiving the indication, as described above.

As further shown in FIG. 13, in some aspects, process 1300 may include communicating with the UE according to the second time domain pattern (block 1320). For example, the base station (e.g., using reception component 1702 and transmission component 1704 depicted in FIG. 17) may communicate with the UE according to the second time domain pattern, as described above.

Process 1300 may include additional aspects, such as any single aspect or any combination of aspects described below and/or in connection with one or more other processes described elsewhere herein.

In a first aspect, the indication indicates the switching time duration.

In a second aspect, alone or in combination with the first aspect, the switching time duration includes one or more slots or symbols.

In a third aspect, alone or in combination with one or more of the first and second aspects, the indication is transmitted in one or more of a MAC-CE, an RRC message, or scheduling DCI.

In a fourth aspect, alone or in combination with one or more of the first through third aspects, process 1300 includes determining the second time domain pattern based at least in part on a UE capability of the UE for the switching time duration.

In a fifth aspect, alone or in combination with one or more of the first through fourth aspects, the second time domain pattern includes one or more of a common configuration of a TDD pattern that is different than a common configuration of a TDD pattern of the first time domain pattern, a dedicated configuration of a TDD pattern that is different than a dedicated configuration of a TDD pattern of the first time domain pattern, or a slot format that is different than a slot format of the first time domain pattern.

In a sixth aspect, alone or in combination with one or more of the first through fifth aspects, the indication indicates the second time domain pattern in DCI.

In a seventh aspect, alone or in combination with one or more of the first through sixth aspects, the multiple time domain pattern candidates include one or more XDD configurations.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

FIG. 14 is a diagram illustrating an example process 1400 performed, for example, by a UE, in accordance with the present disclosure. Example process 1400 is an example where the UE (e.g., UE 120, UE 1020) performs operations associated with time domain pattern switching.

As shown in FIG. 14, in some aspects, process 1400 may include switching from a first time domain pattern to a second time domain pattern after receiving a last scheduled downlink communication of a current subframe, after transmitting a last communication corresponding to a dynamic uplink grant of the current subframe, and if there are no more scheduled downlink communications or grants for the current subframe (block 1410). For example, the UE (e.g., using switching component 1808 depicted in FIG. 18) may switch from a first time domain pattern to a second time domain pattern after receiving a last scheduled downlink communication of a current subframe, after transmitting a last communication corresponding to a dynamic uplink grant of the current subframe, and if there are no more scheduled downlink communications or grants for the current subframe, as described above.

As further shown in FIG. 14, in some aspects, process 1400 may include communicating according to the second time domain pattern (block 1420). For example, the UE (e.g., using reception component 1802 and transmission component 1804 depicted in FIG. 18) may communicate according to the second time domain pattern, as described above.

Process 1400 may include additional aspects, such as any single aspect or any combination of aspects described below and/or in connection with one or more other processes described elsewhere herein.

In a first aspect, the second time domain pattern includes one or more of a common configuration of a TDD pattern that is different than a common configuration of a TDD pattern of the first time domain pattern, a dedicated configuration of a TDD pattern that is different than a dedicated configuration of a TDD pattern of the first time domain pattern, or a slot format that is different than a slot format of the first time domain pattern.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
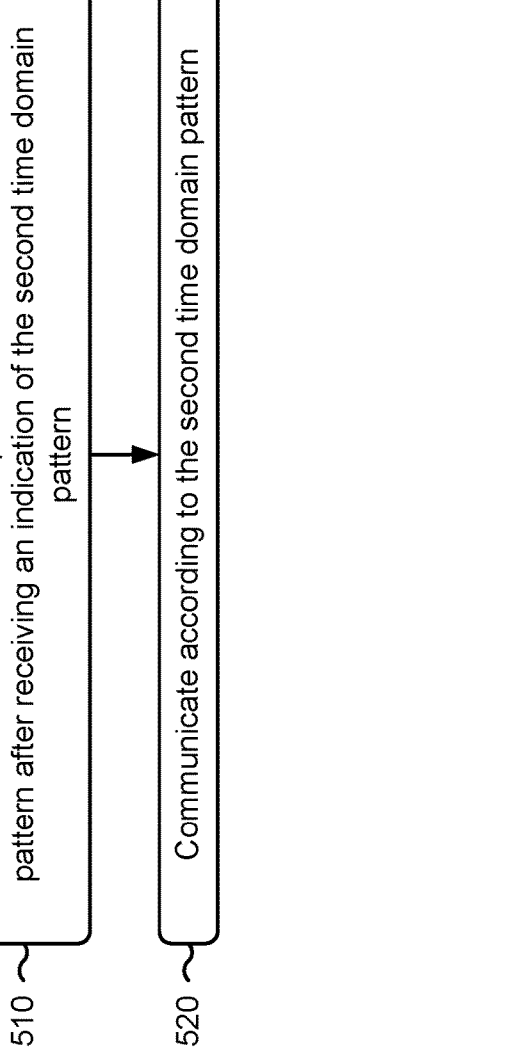
FIG. 15 is a diagram illustrating an example process performed, for example, by a UE, in accordance with the present disclosure.

FIG. 15 is a diagram illustrating an example process 1500 performed, for example, by a UE, in accordance with the present disclosure. Example process 1500 is an example where the UE (e.g., UE 120, UE 1120) performs operations associated with time domain pattern switching.

As shown in FIG. 15, in some aspects, process 1500 may include switching from a first time domain pattern to a second time domain pattern after receiving an indication of the second time domain pattern (block 1510). For example, the UE (e.g., using switching component 1908 depicted in FIG. 19) may switch from a first time domain pattern to a second time domain pattern after receiving an indication of the second time domain pattern, as described above.

As further shown in FIG. 15, in some aspects, process 1500 may include communicating according to the second time domain pattern (block 1520). For example, the UE (e.g., using reception component 1902 and transmission component 1904 depicted in FIG. 19) may communicate according to the second time domain pattern, as described above.

Process 1500 may include additional aspects, such as any single aspect or any combination of aspects described below and/or in connection with one or more other processes described elsewhere herein.

In a first aspect, the indication indicates the second time domain pattern in downlink control information.

In a second aspect, alone or in combination with the first aspect, process 1500 includes selecting the second time domain pattern from among multiple time domain patterns based at least in part on an energy efficiency of the second time domain pattern.

In a third aspect, alone or in combination with one or more of the first and second aspects, switching to the second time domain pattern includes switching to the second time domain pattern in a next slot.

In a fourth aspect, alone or in combination with one or more of the first through third aspects, the second time domain pattern includes one or more of a common configuration of a TDD pattern that is different than a common configuration of a TDD pattern of the first time domain pattern, a dedicated configuration of a TDD pattern that is different than a dedicated configuration of a TDD pattern of the first time domain pattern, or a slot format that is different than a slot format of the first time domain pattern.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

Figure 16:
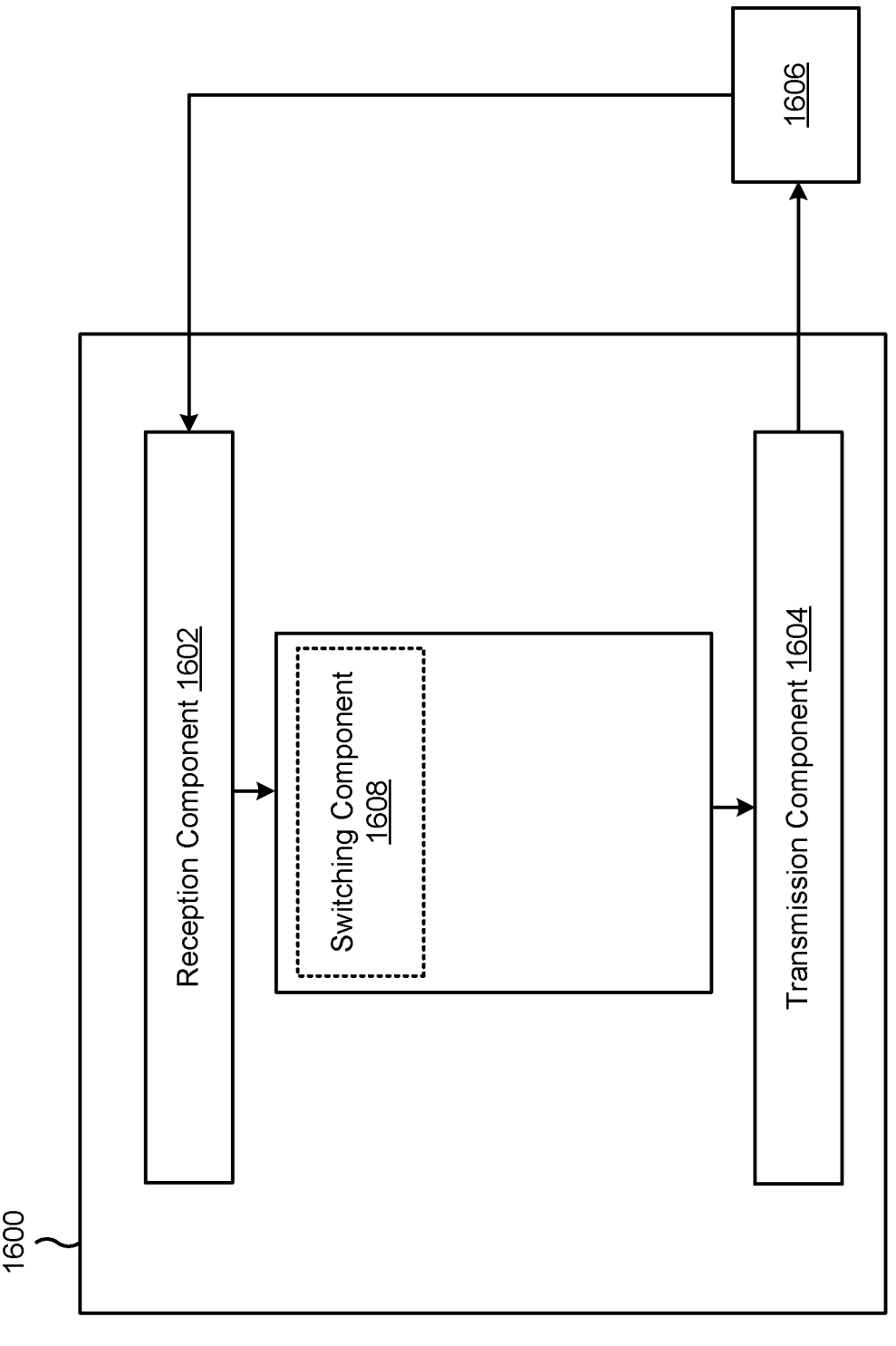
FIGS. 16-19 are block diagrams of example apparatuses for wireless communication, in accordance with the present disclosure.

FIG. 16 is a block diagram of an example apparatus 1600 for wireless communication. The apparatus 1600 may be a UE, or a UE may include the apparatus 1600. In some aspects, the apparatus 1600 includes a reception component 1602 and a transmission component 1604, which may be in communication with one another (for example, via one or more buses and/or one or more other components). As shown, the apparatus 1600 may communicate with another apparatus 1606 (such as a UE, a base station, or another wireless communication device) using the reception component 1602 and the transmission component 1604. As further shown, the apparatus 1600 may include a switching component 1608, among other examples.

In some aspects, the apparatus 1600 may be configured to perform one or more operations described herein in connection with FIGS. 1-11. Additionally, or alternatively, the apparatus 1600 may be configured to perform one or more processes described herein, such as process 1200 of FIG. 12, or a combination thereof. In some aspects, the apparatus 1600 and/or one or more components shown in FIG. 16 may include one or more components of the UE described above in connection with FIG. 2. Additionally, or alternatively, one or more components shown in FIG. 16 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive communications, such as reference signals, control information, data communications, or a combination thereof, from the apparatus 1606. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1600. In some aspects, the reception component 1602 may include one or more antennas, a demodulator, a MIMO detector, a receive processor, a controller/processor, a memory, or a combination thereof, of the UE described above in connection with FIG. 2.

The transmission component 1604 may transmit communications, such as reference signals, control information, data communications, or a combination thereof, to the apparatus 1606. In some aspects, one or more other components of the apparatus 1600 may generate communications and may provide the generated communications to the transmission component 1604 for transmission to the apparatus 1606. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1606. In some aspects, the transmission component 1604 may include one or more antennas, a modulator, a transmit MIMO processor, a transmit processor, a controller/processor, a memory, or a combination thereof, of the UE described above in connection with FIG. 2. In some aspects, the transmission component 1604 may be co-located with the reception component 1602 in a transceiver.

The reception component 1602 may receive, from a base station, an indication to switch from a first time domain pattern to a second time domain pattern. The switching component 1608 may switch to the second time domain pattern a switching time duration after receiving the indication. The reception component 1602 and the transmission component 1604 may communicate with the base station according to the second time domain pattern. The transmission component 1604 may transmit a UE capability for the switching time duration.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally, or alternatively, a set of (one or more) components shown in FIG. 16 may perform one or more functions described as being performed by another set of components shown in FIG. 16.

Figure 17:
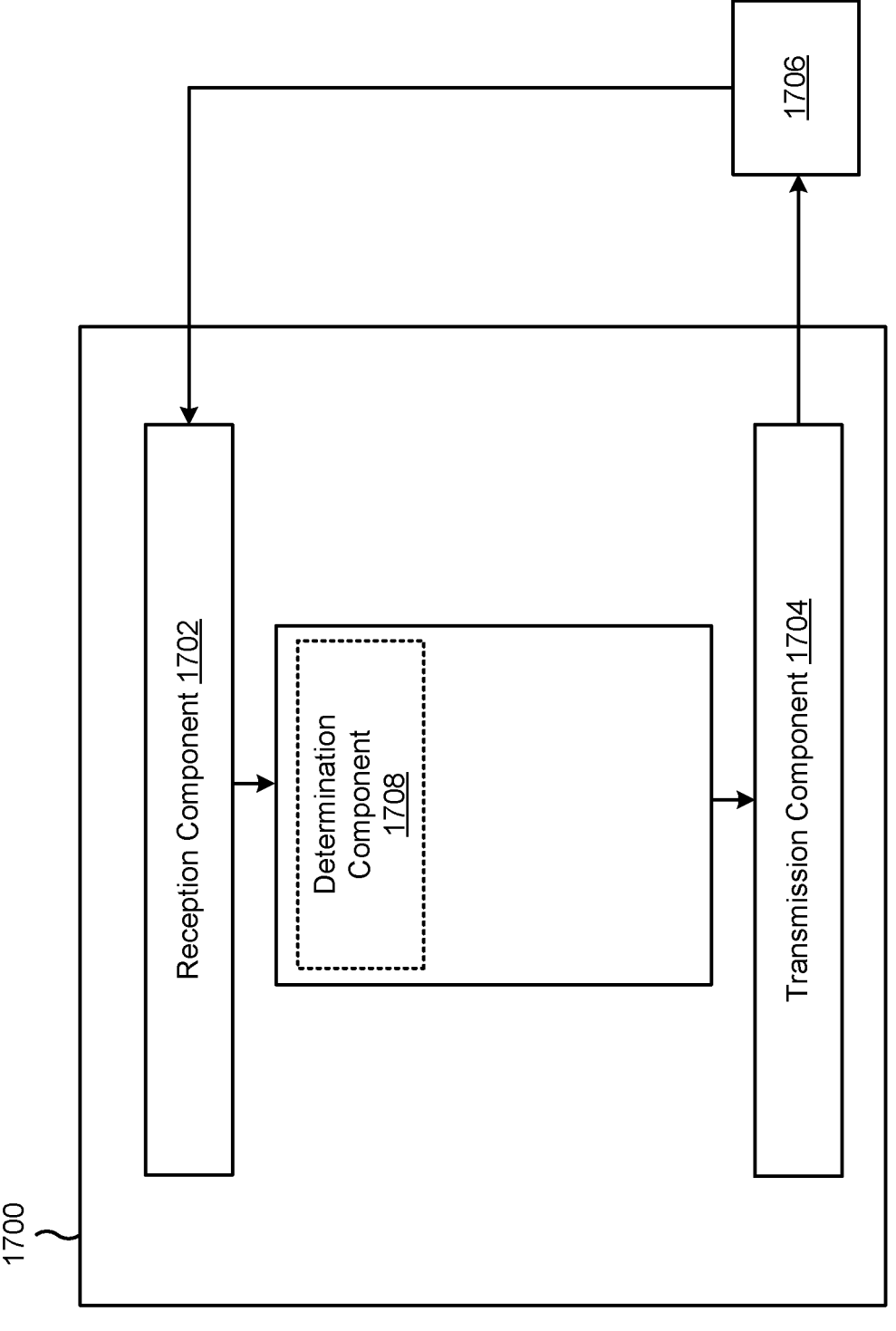

FIG. 17 is a block diagram of an example apparatus 1700 for wireless communication. The apparatus 1700 may be a base station, or a base station may include the apparatus 1700. In some aspects, the apparatus 1700 includes a reception component 1702 and a transmission component 1704, which may be in communication with one another (for example, via one or more buses and/or one or more other components). As shown, the apparatus 1700 may communicate with another apparatus 1706 (such as a UE, a base station, or another wireless communication device) using the reception component 1702 and the transmission component 1704. As further shown, the apparatus 1700 may include a determination component 1708, among other examples.

In some aspects, the apparatus 1700 may be configured to perform one or more operations described herein in connection with FIGS. 1-11. Additionally, or alternatively, the apparatus 1700 may be configured to perform one or more processes described herein, such as process 1300 of FIG. 13, process 1400, and/or a combination thereof. In some aspects, the apparatus 1700 and/or one or more components shown in FIG. 17 may include one or more components of the base station described above in connection with FIG. 2. Additionally, or alternatively, one or more components shown in FIG. 17 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1702 may receive communications, such as reference signals, control information, data communications, or a combination thereof, from the apparatus 1706. The reception component 1702 may provide received communications to one or more other components of the apparatus 1700. In some aspects, the reception component 1702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1700. In some aspects, the reception component 1702 may include one or more antennas, a demodulator, a MIMO detector, a receive processor, a controller/processor, a memory, or a combination thereof, of the base station described above in connection with FIG. 2.

The transmission component 1704 may transmit communications, such as reference signals, control information, data communications, or a combination thereof, to the apparatus 1706. In some aspects, one or more other components of the apparatus 1700 may generate communications and may provide the generated communications to the transmission component 1704 for transmission to the apparatus 1706. In some aspects, the transmission component 1704 may perform signal processing on the generated communications (such as filtering, amplification, modulation, digital-to-analog conversion, multiplexing, interleaving, mapping, or encoding, among other examples), and may transmit the processed signals to the apparatus 1706. In some aspects, the transmission component 1704 may include one or more antennas, a modulator, a transmit MIMO processor, a transmit processor, a controller/processor, a memory, or a combination thereof, of the base station described above in connection with FIG. 2. In some aspects, the transmission component 1704 may be co-located with the reception component 1702 in a transceiver.

The transmission component 1704 may transmit, to a UE, an indication to switch from a first time domain pattern to a second time domain pattern a switching time duration after receiving the indication. The reception component 1702 and/or the transmission component 1704 may communicate with the UE according to the second time domain pattern.

The determination component 1708 may determine the second time domain pattern based at least in part on a UE capability of the UE for the switching time duration.

The number and arrangement of components shown in FIG. 17 are provided as an example. In practice, there may be additional components, fewer components, different components, or differently arranged components than those shown in FIG. 17. Furthermore, two or more components shown in FIG. 17 may be implemented within a single component, or a single component shown in FIG. 17 may be implemented as multiple, distributed components. Additionally, or alternatively, a set of (one or more) components shown in FIG. 17 may perform one or more functions described as being performed by another set of components shown in FIG. 17.

Figure 18:
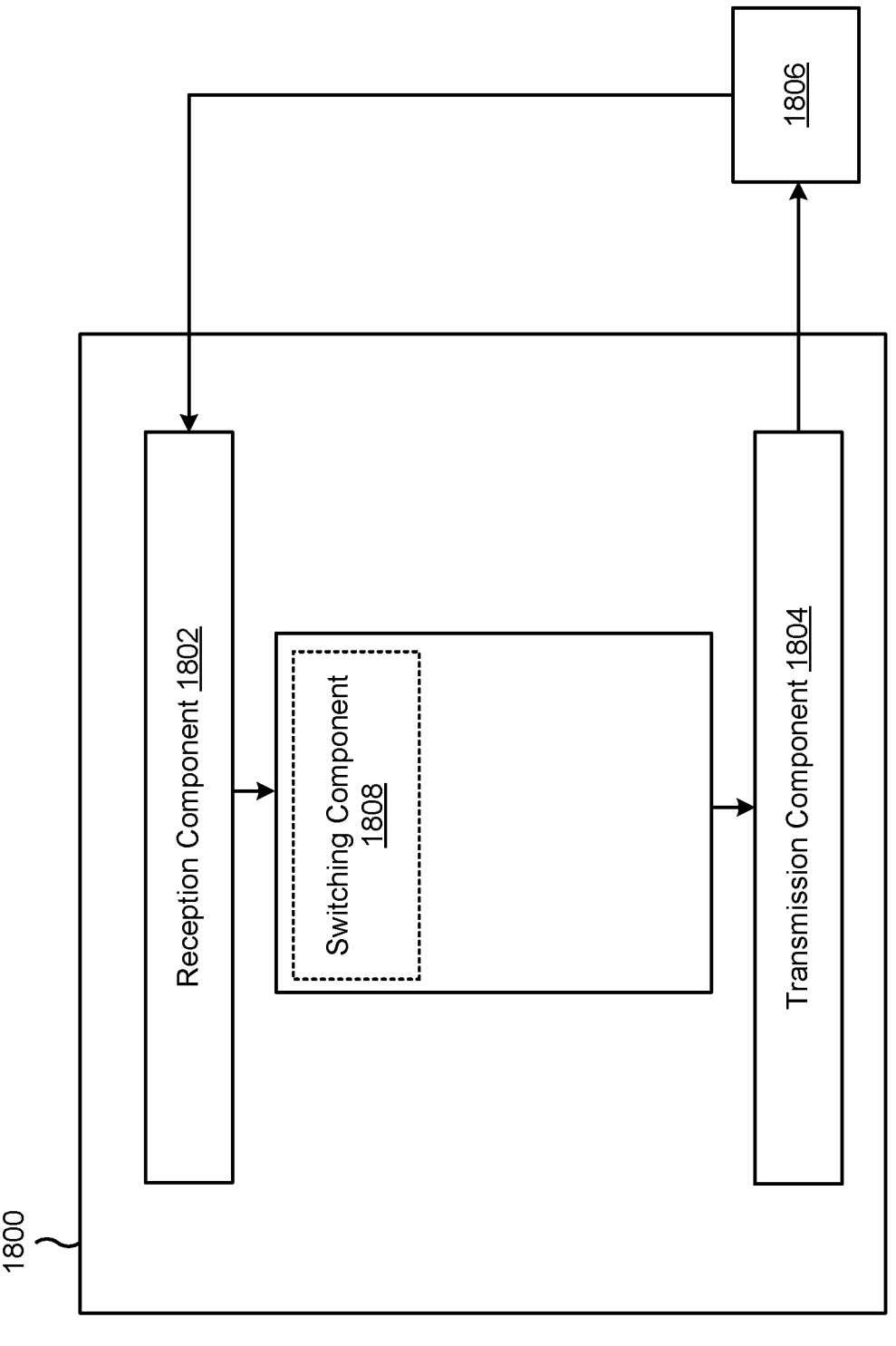

FIG. 18 is a block diagram of an example apparatus 1800 for wireless communication. The apparatus 1800 may be a UE, or a UE may include the apparatus 1800. In some aspects, the apparatus 1800 includes a reception component 1802 and a transmission component 1804, which may be in communication with one another (for example, via one or more buses and/or one or more other components). As shown, the apparatus 1800 may communicate with another apparatus 1806 (such as a UE, a base station, or another wireless communication device) using the reception component 1802 and the transmission component 1804. As further shown, the apparatus 1800 may include a switching component 1808, among other examples.

In some aspects, the apparatus 1800 may be configured to perform one or more operations described herein in connection with FIGS. 1-11. Additionally, or alternatively, the apparatus 1800 may be configured to perform one or more processes described herein, such as process 1400 of FIG. 14. In some aspects, the apparatus 1800 and/or one or more components shown in FIG. 18 may include one or more components of the UE described above in connection with FIG. 2. Additionally, or alternatively, one or more components shown in FIG. 18 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1802 may receive communications, such as reference signals, control information, data communications, or a combination thereof, from the apparatus 1806. The reception component 1802 may provide received communications to one or more other components of the apparatus 1800. In some aspects, the reception component 1802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1800. In some aspects, the reception component 1802 may include one or more antennas, a demodulator, a MIMO detector, a receive processor, a controller/processor, a memory, or a combination thereof, of the UE described above in connection with FIG. 2.

The transmission component 1804 may transmit communications, such as reference signals, control information, data communications, or a combination thereof, to the apparatus 1806. In some aspects, one or more other components of the apparatus 1800 may generate communications and may provide the generated communications to the transmission component 1804 for transmission to the apparatus 1806. In some aspects, the transmission component 1804 may perform signal processing on the generated communications (such as filtering, amplification, modulation, digital-to-analog conversion, multiplexing, interleaving, mapping, or encoding, among other examples), and may transmit the processed signals to the apparatus 1806. In some aspects, the transmission component 1804 may include one or more antennas, a modulator, a transmit MIMO processor, a transmit processor, a controller/processor, a memory, or a combination thereof, of the UE described above in connection with FIG. 2. In some aspects, the transmission component 1804 may be co-located with the reception component 1802 in a transceiver.

The switching component 1808 may switch from a first time domain pattern to a second time domain pattern after receiving a last scheduled downlink communication of a current subframe, after transmitting a last communication corresponding to a dynamic uplink grant of the current subframe, and if there are no more scheduled downlink communications or grants for the current subframe. The reception component 1802 and/or the transmission component 1804 may communicate according to the second time domain pattern.

The number and arrangement of components shown in FIG. 18 are provided as an example. In practice, there may be additional components, fewer components, different components, or differently arranged components than those shown in FIG. 18. Furthermore, two or more components shown in FIG. 18 may be implemented within a single component, or a single component shown in FIG. 18 may be implemented as multiple, distributed components. Additionally, or alternatively, a set of (one or more) components shown in FIG. 18 may perform one or more functions described as being performed by another set of components shown in FIG. 18.

Figure 19:
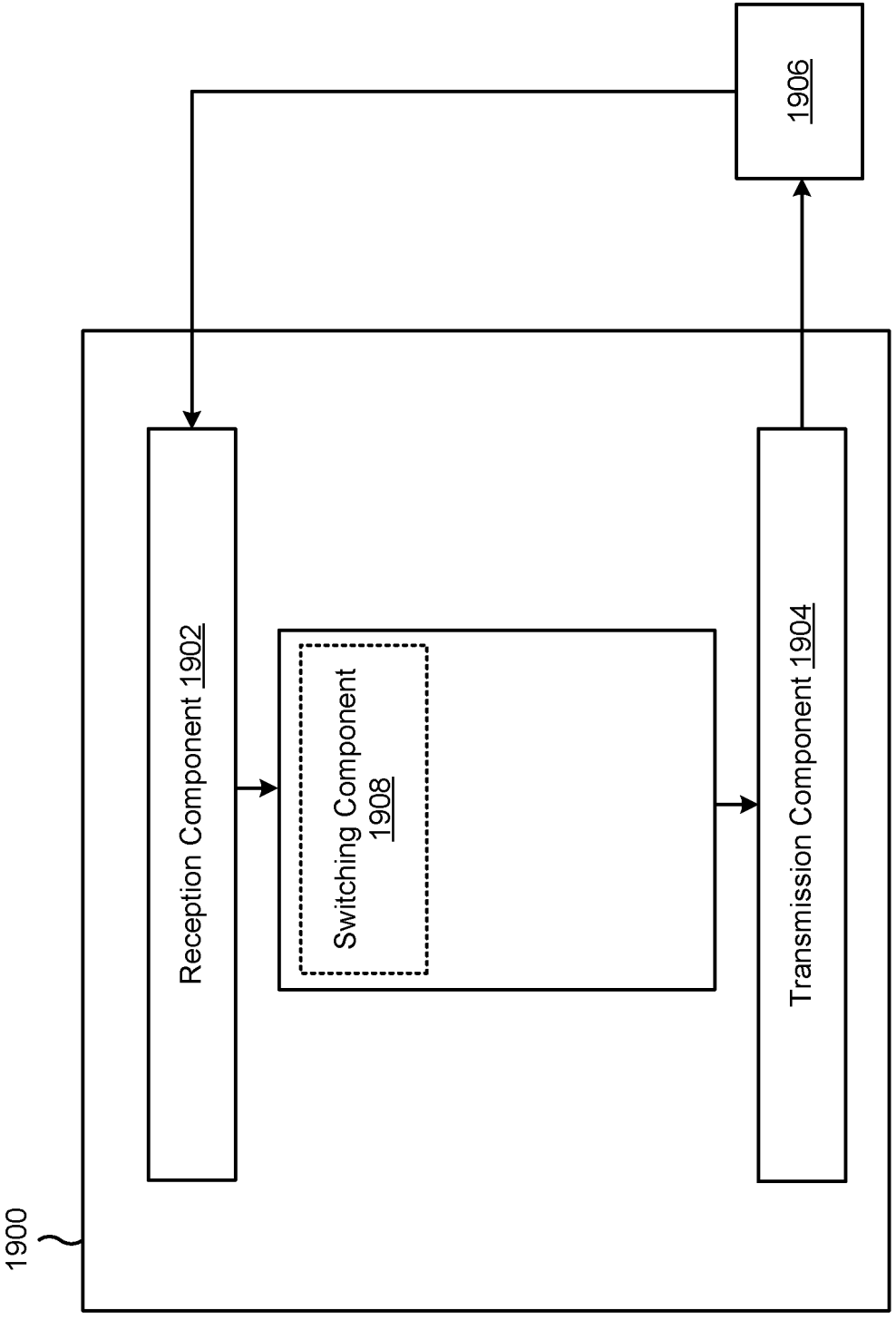

FIG. 19 is a block diagram of an example apparatus 1900 for wireless communication. The apparatus 1900 may be a UE, or a UE may include the apparatus 1900. In some aspects, the apparatus 1900 includes a reception component 1902 and a transmission component 1904, which may be in communication with one another (for example, via one or more buses and/or one or more other components). As shown, the apparatus 1900 may communicate with another apparatus 1906 (such as a UE, a base station, or another wireless communication device) using the reception component 1902 and the transmission component 1904. As further shown, the apparatus 1900 may include a switching component 1908, among other examples.

In some aspects, the apparatus 1900 may be configured to perform one or more operations described herein in connection with FIGS. 1-11. Additionally, or alternatively, the apparatus 1900 may be configured to perform one or more processes described herein, such as process 1500 of FIG. 15. In some aspects, the apparatus 1900 and/or one or more components shown in FIG. 19 may include one or more components of the UE described above in connection with FIG. 2. Additionally, or alternatively, one or more components shown in FIG. 19 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1902 may receive communications, such as reference signals, control information, data communications, or a combination thereof, from the apparatus 1906. The reception component 1902 may provide received communications to one or more other components of the apparatus 1900. In some aspects, the reception component 1902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1900. In some aspects, the reception component 1902 may include one or more antennas, a demodulator, a MIMO detector, a receive processor, a controller/processor, a memory, or a combination thereof, of the UE described above in connection with FIG. 2.

The transmission component 1904 may transmit communications, such as reference signals, control information, data communications, or a combination thereof, to the apparatus 1906. In some aspects, one or more other components of the apparatus 1900 may generate communications and may provide the generated communications to the transmission component 1904 for transmission to the apparatus 1906. In some aspects, the transmission component 1904 may perform signal processing on the generated communications (such as filtering, amplification, modulation, digital-to-analog conversion, multiplexing, interleaving, mapping, or encoding, among other examples), and may transmit the processed signals to the apparatus 1906. In some aspects, the transmission component 1904 may include one or more antennas, a modulator, a transmit MIMO processor, a transmit processor, a controller/processor, a memory, or a combination thereof, of the UE described above in connection with FIG. 2. In some aspects, the transmission component 1904 may be co-located with the reception component 1902 in a transceiver.

The switching component 1908 may switch from a first time domain pattern to a second time domain pattern after receiving an indication of the second time domain pattern. The reception component 1902 and/or the transmission component 1904 may communicate according to the second time domain pattern.

The switching component 1908 may select the second time domain pattern from among multiple time domain patterns based at least in part on an energy efficiency of the second time domain pattern.

The number and arrangement of components shown in FIG. 19 are provided as an example. In practice, there may be additional components, fewer components, different components, or differently arranged components than those shown in FIG. 19. Furthermore, two or more components shown in FIG. 19 may be implemented within a single component, or a single component shown in FIG. 19 may be implemented as multiple, distributed components. Additionally, or alternatively, a set of (one or more) components shown in FIG. 19 may perform one or more functions described as being performed by another set of components shown in FIG. 19.

The foregoing disclosure provides illustration and description, but is not intended to be exhaustive or to limit the aspects to the precise forms disclosed. Modifications and variations may be made in light of the above disclosure or may be acquired from practice of the aspects.

The following provides an overview of some Aspects of the present disclosure:

Aspect 1: A method of wireless communication performed by a user equipment (UE), comprising: receiving, from a base station, an indication to switch from a first time domain pattern to a second time domain pattern; switching to the second time domain pattern a switching time duration after receiving the indication; and communicating with the base station according to the second time domain pattern.

Aspect 2: The method of Aspect 1, wherein the indication indicates the switching time duration.

Aspect 3: The method of Aspect 2, wherein the indication is received in a medium access control control element (MAC-CE) or a radio resource control message.

Aspect 4: The method of Aspect 2 or 3, wherein the switching time duration includes one or more slots or symbols.

Aspect 5: The method of Aspect 2 or 3, wherein the switching time duration includes a quantity of milliseconds.

Aspect 6: The method of Aspect 2, wherein the indication is received in scheduling downlink control information.

Aspect 7: The method of any of Aspects 1-6, further comprising transmitting a UE capability for the switching time duration.

Aspect 8: The method of any of Aspects 1-7, wherein the second time domain pattern includes one or more of: a common configuration of a time division duplex (TDD) pattern that is different than a common configuration of a TDD pattern of the first time domain pattern, a dedicated configuration of a TDD pattern that is different than a dedicated configuration of a TDD pattern of the first time domain pattern, or a slot format that is different than a slot format of the first time domain pattern.

Aspect 9: A method of wireless communication performed by a base station, comprising: transmitting, to a user equipment (UE), an indication to switch from a first time domain pattern to a second time domain pattern a switching time duration after receiving the indication; and communicating with the UE according to the second time domain pattern.

Aspect 10: The method of Aspect 9, wherein the indication indicates the switching time duration.

Aspect 11: The method of Aspect 10, wherein the switching time duration includes one or more slots or symbols.

Aspect 12: The method of any of Aspects 9-11, wherein the indication is transmitted in one or more of a medium access control control message (MAC-CE), a radio resource control message, or scheduling downlink control information (DCI).

Aspect 13: The method of any of Aspects 9-12, further comprising determining the second time domain pattern based at least in part on a UE capability of the UE for the switching time duration.

Aspect 14: The method of any of Aspects 9-13, wherein the second time domain pattern includes one or more of: a common configuration of a time division duplex (TDD) pattern that is different than a common configuration of a TDD pattern of the first time domain pattern, a dedicated configuration of a TDD pattern that is different than a dedicated configuration of a TDD pattern of the first time domain pattern, or a slot format that is different than a slot format of the first time domain pattern.

Aspect 15: The method of any of Aspects 9-14, wherein the indication indicates the second time domain pattern in downlink control information.

Aspect 16: A method of wireless communication performed by a user equipment (UE), comprising: switching from a first time domain pattern to a second time domain pattern after receiving a last scheduled downlink communication of a current subframe, after transmitting a last communication corresponding to a dynamic uplink grant of the current subframe, and if there are no more scheduled downlink communications or grants for the current subframe; and communicating according to the second time domain pattern.

Aspect 17: The method of Aspect 16, wherein the second time domain pattern includes one or more of: a common configuration of a time division duplex (TDD) pattern that is different than a common configuration of a TDD pattern of the first time domain pattern, a dedicated configuration of a TDD pattern that is different than a dedicated configuration of a TDD pattern of the first time domain pattern, or a slot format that is different than a slot format of the first time domain pattern.

Aspect 18: A method of wireless communication performed by a user equipment (UE), comprising: switching from a first time domain pattern to a second time domain pattern after receiving an indication of the second time domain pattern; and communicating according to the second time domain pattern.

Aspect 19: The method of Aspect 18, wherein the indication indicates the second time domain pattern in downlink control information.

Aspect 20: The method of Aspect 18 or 19, further comprising selecting the second time domain pattern from among multiple time domain patterns based at least in part on an energy efficiency of the second time domain pattern.

Aspect 21: The method of any of Aspects 18-20, wherein switching to the second time domain pattern includes switching to the second time domain pattern in a next slot.

Aspect 22: The method of any of Aspects 18-21, wherein the second time domain pattern includes one or more of: a common configuration of a time division duplex (TDD) pattern that is different than a common configuration of a TDD pattern of the first time domain pattern, a dedicated configuration of a TDD pattern that is different than a dedicated configuration of a TDD pattern of the first time domain pattern, or a slot format that is different than a slot format of the first time domain pattern.

Aspect 23: An apparatus for wireless communication at a device, comprising a processor; memory coupled with the processor; and instructions stored in the memory and executable by the processor to cause the apparatus to perform the method of one or more Aspects of Aspects 1-22.

Aspect 24: A device for wireless communication, comprising a memory and one or more processors coupled to the memory, the memory and the one or more processors configured to perform the method of one or more Aspects of Aspects 1-22.

Aspect 25: An apparatus for wireless communication, comprising at least one means for performing the method of one or more Aspects of Aspects 1-22.

Aspect 26: A non-transitory computer-readable medium storing code for wireless communication, the code comprising instructions executable by a processor to perform the method of one or more Aspects of Aspects 1-22.

Aspect 27: A non-transitory computer-readable medium storing a set of instructions for wireless communication, the set of instructions comprising one or more instructions that, when executed by one or more processors of a device, cause the device to perform the method of one or more Aspects of Aspects 1-22.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors, coupled to the one or more memories, configured to:
     receive, from a network entity, multiple time domain pattern candidates;
     communicate with the network entity according to a first time domain pattern of the multiple time domain pattern candidates,
       wherein the first time domain pattern includes a time division duplex (TDD) configuration;
     select a second time domain pattern of the multiple time domain pattern candidates,
       wherein the second time domain pattern includes a full duplex configuration;
     receive, from the network entity, an indication to switch from the first time domain pattern to the second time domain pattern;
     switch to the second time domain pattern a switching time duration after receiving the indication; and
     communicate with the network entity according to the second time domain pattern.

2. The UE of claim 1, wherein the indication indicates the switching time duration.

3. The UE of claim 2, wherein the one or more processors, to receive the indication, are configured to:
   receive the indication in a medium access control control element (MAC-CE) or a radio resource control message.

4. The UE of claim 2, wherein the switching time duration includes one or more slots or symbols.

5. The UE of claim 2, wherein the switching time duration includes a first amount of time based at least in part on the switch to the second time domain pattern including a switch from a downlink symbol in the first time domain pattern to a downlink symbol in the second time domain pattern, or wherein the switching time duration includes a second amount of time based at least in part on the switch to the second time domain pattern including a switch from a downlink symbol in the first time domain pattern to an uplink symbol in the second time domain pattern.

6. The UE of claim 2, wherein the one or more processors, to receive the indication, are configured to:
  receive the indication in scheduling downlink control information.

7. The UE of claim 1, wherein the one or more processors are further configured to transmit a UE capability for the switching time duration.

8. The UE of claim 1, wherein the first time domain pattern includes one or more of: a common configuration of a TDD pattern, a dedicated configuration of a TDD pattern, or a slot format that is different than a slot format of the second time domain pattern.

9. The UE of claim 1, wherein the one or more processors, to switch to the second time domain pattern, are configured to:
  switch to the second time domain pattern after a last scheduled downlink communication of a current subframe is received, after a last communication corresponding to a dynamic uplink grant of the current subframe is transmitted, and based on there being no more scheduled downlink communications or grants for the current subframe.

10. The UE of claim 1, wherein the indication indicates the second time domain pattern.

11. A network entity for wireless communication, comprising:
  one or more memories; and
  one or more processors, coupled to the one or more memories, configured to:
    transmit, to a user equipment (UE), multiple time domain pattern candidates;
    communicate with the UE according to a first time domain pattern of the multiple time domain pattern candidates,
      wherein the first time domain pattern includes a time division duplex (TDD) configuration;
    receive a selection of a second time domain pattern, of the multiple time domain pattern candidates,
      wherein the second time domain pattern includes a full duplex configuration;
    transmit, to the UE, an indication to switch from the first time domain pattern to the second time domain pattern a switching time duration after receiving the indication; and
    communicate with the UE according to the second time domain pattern.

12. The network entity of claim 11, wherein the indication indicates the switching time duration.

13. The network entity of claim 12, wherein the switching time duration includes one or more slots or symbols.

14. The network entity of claim 11, wherein the one or more processors, to transmit the indication, are configured to:
  transmit the indication in one or more of a medium access control control message (MAC-CE), a radio resource control message, or scheduling downlink control information (DCI).

15. The network entity of claim 11, wherein the one or more processors are configured to determine the second time domain pattern based at least in part on a UE capability of the UE for the switching time duration.

16. The network entity of claim 11, wherein the first time domain pattern includes one or more of: a common configuration of a TDD pattern, a dedicated configuration of a TDD pattern, or a slot format that is different than a slot format of the second time domain pattern.

17. The network entity of claim 11, wherein the indication indicates the second time domain pattern in downlink control information.

18. A user equipment (UE) for wireless communication, comprising:
  one or more memories; and
  one or more processors, coupled to the one or more memories, configured to:
    communicate according to a first time domain pattern that includes a time division duplex (TDD) configuration;
    select a second time domain pattern that includes a full duplex configuration;
    switch from the first time domain pattern to the second time domain pattern after receiving a last scheduled downlink communication of a current subframe, after transmitting a last communication corresponding to a dynamic uplink grant of the current subframe, and if there are no more scheduled downlink communications or grants for the current subframe; and
    communicate according to the second time domain pattern.

19. The UE of claim 18, wherein the first time domain pattern includes one or more of: a common configuration of a TDD pattern, a dedicated configuration of a TDD pattern, or a slot format that is different than a slot format of the first time domain pattern.

20. A user equipment (UE) for wireless communication, comprising:
  one or more memories; and
  one or more processors, coupled to the one or more memories, configured to:
    communicate according to a first time domain pattern that includes a time division duplex (TDD) configuration;
    select a second time domain pattern that includes a full duplex configuration;
    switch from the first time domain pattern to the second time domain pattern after receiving an indication of the second time domain pattern; and
    communicate according to the second time domain pattern.

21. The UE of claim 20, wherein the indication indicates the second time domain pattern in downlink control information.

22. The UE of claim 20, wherein the one or more processors, to select the second time domain pattern, are configured to select the second time domain pattern from among multiple time domain patterns based at least in part on an energy efficiency of the second time domain pattern.

23. The UE of claim 20, wherein the one or more processors, to switch to the second time domain pattern, are configured to switch to the second time domain pattern in a next slot.

24. The UE of claim 20, wherein the first time domain pattern includes one or more of: a common configuration of aTDD pattern, a dedicated configuration of a TDD pattern, or a slot format that is different than a slot format of the first time domain pattern.

* * * * *